US010416422B2

(12) United States Patent
Nagatoshi et al.

(10) Patent No.: US 10,416,422 B2
(45) Date of Patent: *Sep. 17, 2019

(54) ZOOM LENS, PROJECTION DISPLAY DEVICE, AND IMAGING APPARATUS FOR FORMING AN INTERMEDIATE IMAGE

(71) Applicant: FUJIFILM Corporation, Tokyo (JP)

(72) Inventors: Yukiko Nagatoshi, Saitama (JP); Kazuki Inoue, Saitama (JP); Akiko Nagahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 15/687,759

(22) Filed: Aug. 28, 2017

(65) Prior Publication Data

US 2018/0059393 A1    Mar. 1, 2018

(30) Foreign Application Priority Data

Aug. 30, 2016  (JP) ................................ 2016-168101

(51) Int. Cl.
*G02B 23/14* (2006.01)
*G02B 15/167* (2006.01)
(Continued)

(52) U.S. Cl.
CPC ........... *G02B 15/167* (2013.01); *G02B 13/16* (2013.01); *G02B 15/163* (2013.01)

(58) Field of Classification Search
CPC ... G02B 9/00; G02B 9/34; G02B 9/60; G02B 15/00; G02B 15/14; G02B 15/16; G02B 15/163
(Continued)

(56) References Cited

U.S. PATENT DOCUMENTS 9,910,251 B2 * 3/2018 Oe ..................... G02B 13/0095
10,101,641 B2 * 10/2018 Nagatoshi ............ G02B 13/009
(Continued)

FOREIGN PATENT DOCUMENTS

JP    H8-307904 A    11/1996
JP    2006-512595    4/2006
(Continued)

OTHER PUBLICATIONS

An Office Action; "Notice of Reasons for Refusal," issued by the Japanese Patent Office on Jun. 18, 2019, which corresponds to Japanese Patent Application No. 2016-168101 and is related to U.S. Appl. No. 15/687,759; with English Translation.
(Continued)

*Primary Examiner* — Arnel C Lavarias
(74) *Attorney, Agent, or Firm* — Studebaker & Brackett PC

(57) ABSTRACT

A zoom lens forms an intermediate image at a position conjugate to a reduction side imaging plane and forms the intermediate image again on a magnification side imaging plane. The zoom lens includes a first optical system on the magnification side, and a second optical system on the reduction side. The intermediate image is formed between the magnification and reduction sides. The second optical system includes two or more movable lens groups, which move by changing spacings between the groups adjacent to each other in a direction of an optical axis during zooming, and two stationary lens groups which remain stationary with respect to the reduction side imaging plane during zooming. One stationary lens group is disposed closest to the reduction side, and has a positive refractive power. Also, a lens group closest to the magnification side in the second optical system has a positive refractive power.

16 Claims, 22 Drawing Sheets

(51) Int. Cl.
*G02B 13/16* (2006.01)
*G02B 15/163* (2006.01)

(58) Field of Classification Search
USPC ....... 359/362, 363, 432, 434, 642, 676, 683, 359/684, 686, 687, 688, 694, 69, 5, 754, 359/763, 771
See application file for complete search history.

(56) References Cited

U.S. PATENT DOCUMENTS

| | | |
|---|---|---|
| 2004/0021953 A1 | 2/2004 | Betensky et al. |
| 2007/0195427 A1 | 8/2007 | Sugita |
| 2012/0120484 A1 | 5/2012 | Konuma et al. |
| 2014/0204351 A1 | 7/2014 | Matsuo |
| 2014/0313589 A1 | 10/2014 | Winterot et al. |
| 2016/0021351 A1 | 1/2016 | Yamagishi et al. |
| 2017/0153427 A1 | 6/2017 | Masui |
| 2018/0059386 A1* | 3/2018 | Nagatoshi .............. G02B 15/14 |
| 2019/0025561 A1 | 1/2019 | Imaoka |

FOREIGN PATENT DOCUMENTS

| | | |
|---|---|---|
| JP | 2006-512595 A | 4/2006 |
| JP | 2007-225877 A | 9/2007 |
| JP | 2012-108267 A | 6/2012 |
| JP | 2015-152890 A | 8/2015 |
| JP | 2015-179270 A | 10/2015 |
| JP | 2016-143032 A | 8/2016 |
| JP | 2017-102239 A | 6/2017 |
| WO | 2013/005444 A1 | 2/2015 |
| WO | 2014/141718 A1 | 2/2017 |
| WO | 2017/195857 A1 | 3/2019 |

OTHER PUBLICATIONS

An Office Action; "Notice of Reasons for Refusal," issued by the Japanese Patent Office dated Jun. 18, 2019, which corresponds to Japanese Patent Application No. 2016-168101 and is related to U.S. Appl. No. 15/687,759; with English Translation.

* cited by examiner

EXAMPLE 1

WIDE-ANGLE END

EXAMPLE 2
WIDE-ANGLE END

EXAMPLE 3

EXAMPLE 4
WIDE-ANGLE END

EXAMPLE 5

EXAMPLE 6

EXAMPLE 7

EXAMPLE 1

EXAMPLE 7

EXAMPLE 8

ZOOM LENS, PROJECTION DISPLAY DEVICE, AND IMAGING APPARATUS FOR FORMING AN INTERMEDIATE IMAGE

CROSS REFERENCE TO RELATED APPLICATIONS

The present application claims priority under 35 U.S.C. § 119 to Japanese Patent Application No. 2016-168101 filed on Aug. 30, 2016. The above application is hereby expressly incorporated by reference, in its entirety, into the present application.

BACKGROUND OF THE INVENTION

1. Field of the Invention

The present invention relates to a zoom lens forming an intermediate image, a projection display device comprising the zoom lens, and an imaging apparatus comprising the zoom lens.

2. Description of the Related Art

In the past, projection display devices, each of which uses a light valve such as a liquid crystal display element or a Digital Micromirror Device (DMD: registered trademark) display element, have come into widespread use. In particular, some widely used devices adopt a configuration in which three light valves are used, illumination light beams with three primary colors of red, green, and blue respectively correspond to the light valves, synthesizes the light beams, which are modulated through the respective light valves, through a prism or the like, and displays an image onto a screen through a zoom lens.

In such a zoom lens used in a type of the projection display device that synthesizes the light beams modulated through the three light valves through a color synthesis optical system and projects the light beams, as described above, in order for a prism or the like for performing color synthesis to be disposed therein and in order to avoid a thermal problem, a long back focal length is necessary. Further, since spectral characteristics of the color synthesizing prism change depending on an angle of incident light, it is necessary for the projection lens to have the characteristic that the entrance pupil is at a sufficiently far position in a case where the reduction side is set as the incident side, that is, to be telecentric on the reduction side.

It has become necessary for such a type of the zoom lens to perform favorable aberration correction appropriate for the resolutions of light valves. Further, from the viewpoint of installability, in order to cope with the demands to have a high zoom ratio function and to perform projection onto a large screen at a short distance, it is necessary for a zoom lens to have a wider angle of view.

A zoom lens, which forms an intermediate image at a position conjugate to the reduction side imaging plane and forms the intermediate image again on the magnification side imaging plane, has been proposed so as to cope with such demands (for example, JP2015-152890A and JP2015-179270A).

In a normal zoom lens of a system which does not form an intermediate image, in a case where an increase in angle of view is intended to be achieved by shortening a focal length thereof, the size of the magnification side lens inevitably becomes excessively large. However, in a zoom lens of a relay system which forms an intermediate image as described above, it is possible to shorten a back focal length of the lens system closer to the magnification side than the intermediate image. Therefore, it is possible to decrease a magnification side lens diameter of the lens system closer to the magnification side than the intermediate image, and this configuration is appropriate for achieving an increase in angle of view by shortening a focal length thereof.

SUMMARY OF THE INVENTION

However, in the lens system described in JP2015-152890A, even a largest angle of view among those of three examples is equal to or less than 110°, and thus it cannot be said that the angle of view is sufficiently wide.

Further, in the lens system described in JP2015-179270A, astigmatism greatly occurs. Thus, in order to ensure performance with such a configuration, there is a problem in that an outer diameter of the lens increases.

The present invention has been made in consideration of the above-mentioned situations, and its object is to provide a zoom lens that forms an intermediate image and has a small size with a wide angle, a projection display device comprising the zoom lens, and an imaging apparatus comprising the zoom lens.

A zoom lens of the present invention forms an intermediate image at a position conjugate to a reduction side imaging plane and forms the intermediate image again on a magnification side imaging plane. The zoom lens comprises: a first optical system on the magnification side; and a second optical system on the reduction side. The intermediate image is formed between the magnification side and the reduction side. The second optical system includes two or more movable lens groups, which move by changing spacings between the groups adjacent to each other in a direction of an optical axis during zooming, and two stationary lens groups which remain stationary with respect to the reduction side imaging plane during zooming. One stationary lens group of the two stationary lens groups is disposed to be closest to the reduction side, and has a positive refractive power. In addition, a lens group closest to the magnification side in the second optical system has a positive refractive power.

It is preferable that the zoom lens of the present invention satisfies Conditional Expression (1), and it is more preferable that the zoom lens satisfies Conditional Expression (1-1).

$$0<|fw|/f21<0.2 \tag{1}$$

$$0.01<|fw|/f21<0.15 \tag{1-1}$$

Here, fw is a focal length of the whole system at a wide-angle end, and f21 is a focal length of the lens group closest to the magnification side in the second optical system.

It is preferable that the zoom lens satisfies Conditional Expression (2), and it is more preferable that the zoom lens satisfies Conditional Expression (2-1).

$$3<b/a<15 \tag{2}$$

$$5<b/a<10 \tag{2-1}$$

Here, b is a ray diameter within a meridian plane of a maximum image height at an F number which is five times a design F number at the wide-angle end, and a is a ray diameter of on-axis rays at the F number which is five times the design F number at the wide-angle end.

In a state where telecentric light at an F number five times a design F number is input from the reduction side, in a case where the magnification side imaging plane is at the infinity, the ray diameters of a and b are set as diameters of rays at a position closer to the magnification side than the lens surface closest to the magnification side. Further, the ray diameter of b is a ray diameter in a direction perpendicular to the principal ray.

It is preferable that a third lens group from the magnification side in the second optical system is the movable lens group which has a positive refractive power.

It is preferable that the zoom lens satisfies Conditional Expression (3).

$$0 < |fw|/f23 < 0.15 \quad (3)$$

Here, fw is a focal length of the whole system at the wide-angle end, and f23 is a focal length of the third lens group from the magnification side in the second optical system.

It is preferable that the zoom lens satisfies Conditional Expression (4).

$$0.05 < |fw|/f2e < 0.3 \quad (4)$$

Here, fw is a focal length of the whole system at the wide-angle end, and f2e is a focal length of a lens group closest to the reduction side in the second optical system.

It is preferable that the zoom lens satisfies Conditional Expression (5), and it is more preferable that the zoom lens satisfies Conditional Expression (5-1).

$$0.7 < f1/|fw| < 3 \quad (5)$$

$$0.8 < f1/|fw| < 2 \quad (5-1)$$

Here, f1 is a focal length of the first optical system at the wide-angle end, and fw is a focal length of the whole system at the wide-angle end.

The second optical system may include, in order from the magnification side, the movable lens group, the stationary lens group, the movable lens group, and the stationary lens group.

The second optical system may include, in order from the magnification side, the stationary lens group, the movable lens group, the movable lens group, and the stationary lens group.

The second optical system may include, in order from the magnification side, the movable lens group, the stationary lens group, the movable lens group, the movable lens group, and the stationary lens group.

It is preferable that the first optical system remains stationary with respect to the reduction side imaging plane during zooming.

A projection display device of the present invention comprises: a light source; a light valve into which light originating from the light source is incident; and the zoom lens of the present invention, the zoom lens projecting an optical image, which is formed by light modulated through the light valve, onto a screen.

An imaging apparatus of the present invention comprises the above-mentioned zoom lens of the present invention.

It should be noted that the "magnification side" means a projected side (screen side). Even in a case where projection is performed in a reduced manner, for convenience, the screen side is referred to as the magnification side. On the other hand, the "reduction side" means an image display element side (light valve side). Even in a case where projection is performed in a reduced manner, for convenience, the light valve side is referred to as the reduction side.

Further, the "comprises . . . or includes . . . " means that the zoom lens may include not only the above-mentioned elements but also lenses substantially having no powers, optical elements, which are not lenses, such as a mirror having no power, a stop, a mask, a cover glass, a filter, and the like.

Further, the "lens group" is not necessarily formed of a plurality of lenses, but may be formed of only one lens.

Further, regarding the "back focal length", the following assumption is considered: the magnification side and the reduction side respectively correspond to the object side and the image side of a general imaging lens, and the magnification side and the reduction side are respectively referred to as the front side and the back side.

According to the present invention, the zoom lens forms an intermediate image at the position conjugate to the reduction side imaging plane and forms the intermediate image again on the magnification side imaging plane. The zoom lens comprises: the first optical system on the magnification side; and the second optical system on the reduction side. The intermediate image is formed between the magnification side and the reduction side. The second optical system includes the two or more movable lens groups, which move by changing spacings between the groups adjacent to each other in a direction of an optical axis during zooming, and the two stationary lens groups which remain stationary with respect to the reduction side imaging plane during zooming. One stationary lens group of the two stationary lens groups is disposed to be closest to the reduction side, and has a positive refractive power. In addition, the lens group closest to the magnification side in the second optical system has a positive refractive power. Therefore, it is possible to provide a zoom lens that has a small size with a wide angle, a projection display device including the zoom lens, and an imaging apparatus including the zoom lens.

DESCRIPTION OF THE PREFERRED EMBODIMENTS

Figure 1:
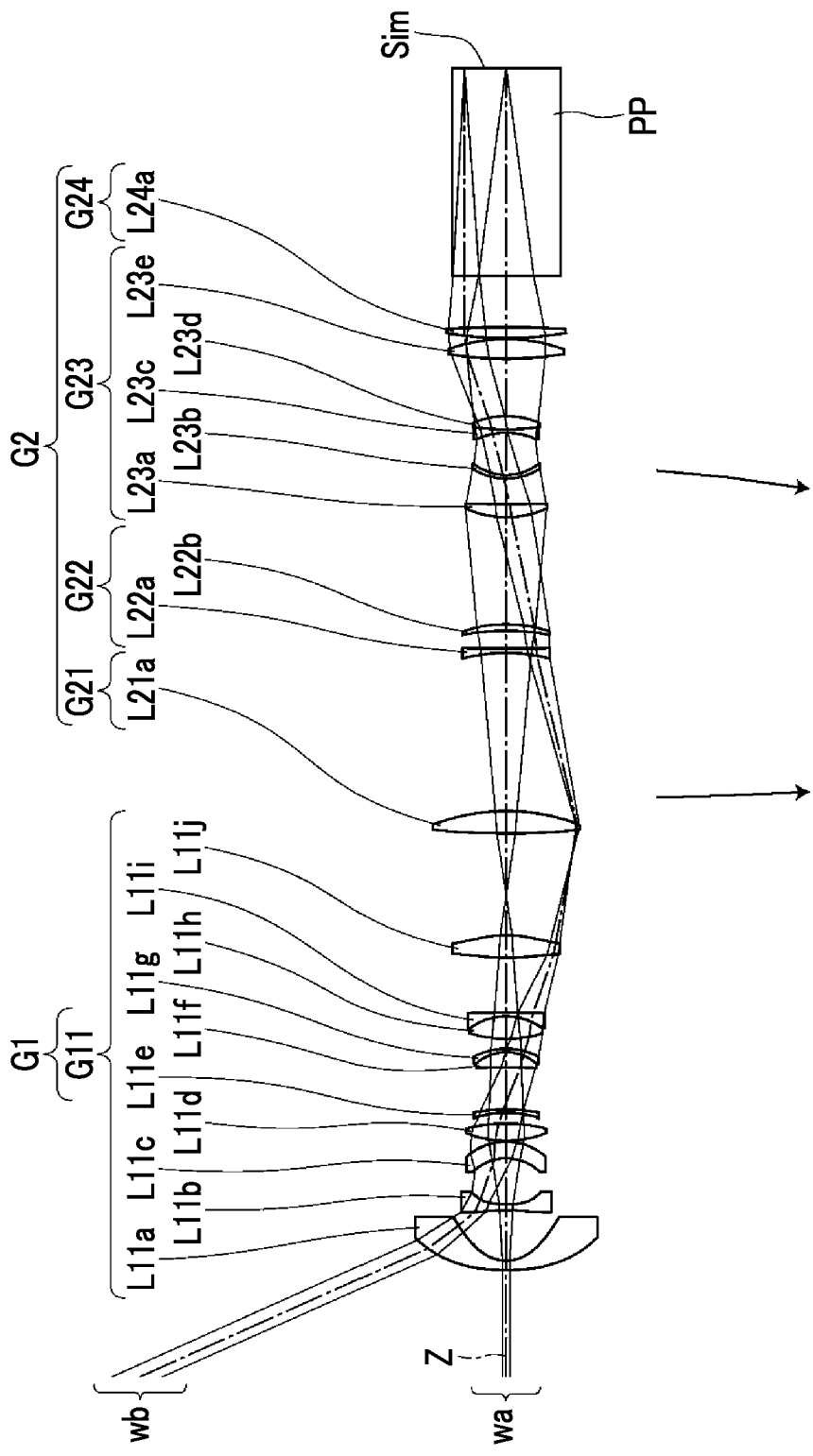
FIG. 1 is a cross-sectional view illustrating a configuration of a zoom lens (common to Example 1) according to an embodiment of the present invention.

Hereinafter, embodiments of the present invention will be described with reference to drawings. FIG. 1 is a cross-sectional view illustrating a configuration of a zoom lens according to an embodiment of the present invention. The exemplary configuration shown in FIG. 1 is the same as the configuration of the zoom lens of Examples 1 to be described later. FIG. 1 shows a state at the wide-angle end, where an image display surface Sim side is the reduction side, and a lens L11a side of a first optical system G1 is a magnification side. Further, in FIG. 1, on-axis rays wa and rays with a maximum angle of view wb are also shown together.

This zoom lens is, for example, mounted on a projection display device, and can be used to project image information displayed on the light valve onto the screen. In FIG. 1, assuming that the zoom lens is mounted on the projection display device, an optical member PP such as a filter or a prism used in a color synthesizing section or an illumination light separating section, and an image display surface Sim of a light valve positioned on a reduction side surface of the optical member PP are also shown. In the projection display device, rays, which are made to have image information through the image display surface Sim on the image display element, are incident into the zoom lens through the optical member PP, and are transmitted onto a screen, which is not shown in the drawing, through the zoom lens.

As shown in FIG. 1, the zoom lens of the present embodiment forms an intermediate image at a position conjugate to a reduction side imaging plane (image display surface Sim) and forms the intermediate image again on a magnification side imaging plane. The zoom lens includes: the first optical system G1 on the magnification side; and a second optical system G2 on the reduction side. The intermediate image is formed therebetween. The second optical system G2 includes two or more movable lens groups, which move by changing spacings between the groups adjacent to each other in a direction of an optical axis during zooming, and two stationary lens groups which remain stationary with respect to the reduction side imaging plane during zooming. One stationary lens group of the two stationary lens groups is disposed to be closest to the reduction side, and has a positive refractive power. In addition, a lens group closest to the magnification side in the second optical system G2 has a positive refractive power.

In a normal zoom lens of a system which does not form an intermediate image, in a case where an increase in angle of view is intended to be achieved by shortening a focal length thereof, the size of the magnification side lens inevitably becomes excessively large. However, in a manner similar to that of the present embodiment, in a zoom lens of a system which forms an intermediate image, it is possible to shorten a back focal length of the first optical system G1 closer to the magnification side than the intermediate image. In addition, it is possible to decrease a magnification side lens diameter, and this configuration is appropriate for achieving an increase in angle of view by shortening a focal length thereof.

Further, zooming is performed by moving a lens system closer to the reduction side than the intermediate image. As for the zooming operation, change in relay magnification of the second optical system G2 closer to the reduction side than the intermediate image corresponds to change in size of the intermediate image, and thus it is possible to achieve an optically simple configuration.

Further, the stationary lens group, which remains stationary with respect to the reduction side imaging plane during zooming and has a positive refractive power, is disposed to be closest to the reduction side. Thereby, it is possible to reduce fluctuation in aberrations during zooming while keeping the zoom lens telecentric.

Further, since the lens group closest to the magnification side in the second optical system G2 has a positive refractive power, it is possible to effectively deflect rays near the maximum image height toward the inside. Thus, it is possible to keep the lens diameter of the optical system from being small.

It is preferable that the zoom lens of the present invention satisfies Conditional Expression (1). By not allowing the result of Conditional Expression (1) to be equal to or less than the lower limit, a second-1 lens group G21, which is the lens group closest to the magnification side in the second optical system G2, is set to have a positive refractive power. Thereby, it is possible to effectively deflect rays near the maximum image height toward the inside. Thus, it is possible to keep the lens diameter of the optical system from being small. By not allowing the result of Conditional Expression (1) to be equal to or greater than the upper limit, it is possible to prevent the power of the second-1 lens group G21 from becoming excessively strong. Thus, it is possible to prevent rays near the maximum angle of view from rapidly changing. As a result, it is possible to suppress astigmatism. In addition, in a case where Conditional Expression (1-1) is satisfied, it is possible to obtain more favorable characteristics. By not allowing the result of Conditional Expression (1-1) to be equal to or less than the lower limit, it is possible to prevent the power of the second-1 lens group G21 from becoming excessively weak. Thus, it is possible to minimize a total length of the second optical system G2, and it is possible to prevent the size of the whole lens system from becoming large.

$$0 < |fw|/f21 < 0.2 \tag{1}$$

$$0.01 < |fw|/f21 < 0.15 \tag{1-1}$$

Here, fw is a focal length of the whole system at the wide-angle end, and f21 is a focal length of the lens group closest to the magnification side in the second optical system G2.

It is preferable that the zoom lens satisfies Conditional Expression (2). By not allowing the result of Conditional Expression (2) to be equal to or less than the lower limit, it is possible to realize a lens which has a wide angle of view, in which various aberrations are satisfactorily corrected, and for which a peripheral light amount ratio is ensured. By not allowing the result of Conditional Expression (2) to be equal to or greater than the upper limit, it is possible to prevent the outer diameter of the lens from being increased. In addition, in a case where Conditional Expression (2-1) is satisfied, it is possible to obtain more favorable characteristics.

$$3<b/a<15 \quad (2)$$

$$5<b/a<10 \quad (2\text{-}1)$$

Here, b is a ray diameter within a meridian plane of the maximum image height at the F number which is five times the design F number at the wide-angle end, and a is a ray diameter of on-axis rays at the F number which is five times the design F number at the wide-angle end.

It is preferable that a second-3 lens group G23, which is a third lens group from the magnification side in the second optical system G2, is the movable lens group which has a positive refractive power. With such a configuration, it is possible to satisfactorily correct astigmatism.

It is preferable that the zoom lens satisfies Conditional Expression (3). By not allowing the result of Conditional Expression (3) to be equal to or less than the lower limit and by making the second-3 lens group G23 have a positive refractive power, there is an advantage in correcting astigmatism. By not allowing the result of the conditional expression (3) to be equal to or greater than the upper limit, the power of the second-3 lens group G23 can be prevented from becoming excessively strong. Thus, there is an advantage in suppressing fluctuation in spherical aberration during zooming.

$$0<|fw|/f23<0.15 \quad (3)$$

Here, fw is a focal length of the whole system at the wide-angle end, and f23 is a focal length of the third lens group from the magnification side in the second optical system G2.

It is preferable that the zoom lens satisfies Conditional Expression (4). By not allowing the result of Conditional Expression (4) to be equal to or less than the lower limit, the power of the lens group closest to the reduction side in the second optical system G2 can be prevented from becoming excessively weak. Thus, it is possible to minimize the total length of the second optical system G2, and it is possible to prevent the whole lens system from becoming large. By not allowing the result of Conditional Expression (4) to be equal to or greater than the upper limit, the power of the lens group closest to the reduction side in the second optical system G2 can be prevented from becoming excessively strong. Thus, there is an advantage in correcting field curvature.

$$0.05<|fw|/f2e<0.3 \quad (4)$$

Here, fw is a focal length of the whole system at the wide-angle end, and f2e is a focal length of a lens group closest to the reduction side in the second optical system G2.

It is preferable that the zoom lens satisfies Conditional Expression (5). By not allowing the result of Conditional Expression (5) to be equal to or less than the lower limit, there is an advantage in correcting spherical aberration, field curvature, and astigmatism. By not allowing the result of Conditional Expression (5) to be equal to or greater than the upper limit, it is possible to prevent the lens diameter near the intermediate imaging position from becoming large. In addition, in a case where Conditional Expression (5-1) is satisfied, it is possible to obtain more favorable characteristics.

$$0.7<f1/|fw|<3 \quad (5)$$

$$0.8<f1/|fw|<2 \quad (5\text{-}1)$$

Here, f1 is a focal length of the first optical system G1 at the wide-angle end, and fw is a focal length of the whole system at the wide-angle end.

The second optical system G2 may include, in order from the magnification side, a movable lens group, a stationary lens group, a movable lens group, and a stationary lens group. In such a manner, by making one of two movable lens groups closest to the magnification side in the second optical system G2 as a relay lens, it is possible to effectively suppress fluctuation in lateral chromatic aberration during zooming. In addition, Examples 1 to 4 to be described later correspond to this embodiment.

The second optical system G2 may include, in order from the magnification side, a stationary lens group, a movable lens group, a movable lens group, and a stationary lens group. In such a manner, by arranging the two movable lens groups at adjacent positions, the mechanical configuration is simplified, so that costs thereof can be reduced. In addition, Examples 5 to 8 to be described later correspond to this embodiment.

The second optical system G2 may include, in order from the magnification side, a movable lens group, a stationary lens group, a movable lens group, a movable lens group, and a stationary lens group. By increasing the number of movable lens groups to three as compared with the above-mentioned configuration, it is possible to more satisfactorily suppress fluctuation in various aberrations during zooming. Thus, it is possible to further increase the zoom ratio. In addition, Example 9 to be described later corresponds to this embodiment.

It is preferable that the first optical system G1 remains stationary with respect to the reduction side imaging plane during zooming. With such a configuration, it is possible to simplify the lens configuration.

Next, numerical examples of the zoom lens of the present invention will be described.

First, a zoom lens of Example 1 will be described. FIG. 1 is a cross-sectional diagram illustrating a configuration of the zoom lens of Example 1. In addition, in FIG. 1 and FIGS. 2 to 9 corresponding to Examples 2 to 9, the image display surface Sim side is the reduction side, and the lens L11a side of the first optical system G1 is the magnification side. Further, in FIGS. 1 to 9, on-axis rays wa and rays with a maximum angle of view wb are also shown together.

The zoom lens of Example 1 includes a first optical system G1 on the magnification side, and a second optical system G2 on the reduction side, in a state where the intermediate image is formed therebetween. The first optical system G1 includes only a first-1 lens group G11. The second optical system G2 includes a second-1 lens group G21, a second-2 lens group G22, a second-3 lens group G23, and a second-4 lens group G24.

The first-1 lens group G11, the second-2 lens group G22, and the second-4 lens group G24 remain stationary with respect to the reduction side imaging plane (image display surface Sim) during zooming. The second-1 lens group G21 and the second-3 lens group G23 are configured to move by changing spacings of the groups adjacent to each other in the direction of the optical axis during zooming.

The first-1 lens group G11 includes ten lenses as lenses L11a to L11j. The second-1 lens group G21 includes one lens as only a lens L21a. The second-2 lens group G22 includes two lenses as lenses L22a and L22b. The second-3 lens group G23 includes five lenses as lenses L23a to L23e. The second-4 lens group G24 includes one lens as only a lens L24a.

Table 1 shows lens data of the zoom lens of Example 1, Table 2 shows data about specification, Table 3 shows surface spacings which are variable during zooming, and Table 4 shows data about aspheric coefficients thereof. Hereinafter, meanings of the reference signs in the tables are, for example, as described in Example 1, and are basically the same as those in Examples 2 to 9.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface spacing shows spacings on the optical axis Z between the respective surfaces and the subsequent surfaces. Further, the column of n shows a refractive index of each optical element at the d line (a wavelength of 587.6 nm), and the column of ν shows an Abbe number of each optical element at the d line (a wavelength of 587.6 nm). Here, the sign of the radius of curvature is positive in a case where a surface has a shape convex toward the magnification side, and is negative in a case where a surface has a shape convex toward the reduction side. The lens data additionally shows the optical member PP. Further, in the lens data, in each place of the surface spacing which is variable during zooming, DD[surface number] is noted. Numerical values each corresponding to the DD[surface number] are shown in Table 3.

In the data about the specification of Table 2, values of the zoom ratio, the focal length f, back focal length Bf, the F number FNo., and the total angle of view 2ω are noted.

In the lens data of Table 1, the reference sign * is attached to surface numbers of aspheric surfaces, and radii of curvature of the aspheric surfaces are represented by numerical values of paraxial radii of curvature. In the data about aspheric coefficients of Table 4, surface numbers of aspheric surfaces, and aspheric coefficients of these aspheric surfaces are noted. The "E±n" (n: an integer) in numerical values of the aspheric coefficients of Table 4 indicates "×10$^{±n}$". The aspheric coefficients are values of the coefficients KA and Am (m=3 ... maximum 20) in aspheric surface expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric coefficients (m=3 ... maximum 20).

TABLE 1

EXAMPLE 1·LENS DATA (n AND ν ARE BASED ON d LINE)

| SURFACE NUMBER | RADIUS OF CURVATURE | SURFACE SPACING | n | ν |
|---|---|---|---|---|
| *1 | 80.6473 | 2.2663 | 1.69350 | 53.18 |
| *2 | 9.1471 | 12.1164 | | |
| *3 | −31.3855 | 1.4168 | 1.80610 | 40.88 |
| *4 | 28.5427 | 11.0669 | | |
| 5 | −11.5837 | 4.0228 | 1.85150 | 40.78 |
| 6 | −14.1907 | 0.2266 | | |
| 7 | 26.1012 | 4.1199 | 1.85150 | 40.78 |
| 8 | −39.3966 | 2.3919 | | |
| 9 | −26.3672 | 0.8090 | 1.89286 | 20.36 |
| 10 | −42.4239 | 10.0949 | | |
| 11 | −130.4109 | 3.7052 | 1.49700 | 81.54 |
| 12 | −10.8701 | 0.7994 | 1.85478 | 24.80 |
| 13 | −16.7081 | 2.3929 | | |
| 14 | 29.6286 | 5.3920 | 1.49700 | 81.54 |
| 15 | −14.8446 | 0.9170 | 1.85478 | 24.80 |
| 16 | −383.4778 | 13.2031 | | |
| *17 | 68.7066 | 5.4422 | 1.69350 | 53.18 |
| *18 | −22.5650 | DD[18] | | |
| 19 | 172.1176 | 5.4189 | 1.85478 | 24.80 |
| 20 | −48.9826 | DD[20] | | |
| 21 | −40.0453 | 1.0256 | 1.51633 | 64.14 |
| 22 | 458.7553 | 4.2843 | | |
| 23 | −53.4461 | 1.5756 | 1.85478 | 24.80 |
| 24 | −31.7531 | DD[24] | | |
| 25 | 22.9231 | 3.2440 | 1.59522 | 67.73 |
| 26 | 800.8242 | 6.0807 | | |
| 27 | 15.1415 | 0.8276 | 1.51742 | 52.43 |
| 28 | 12.5991 | 10.1872 | | |
| 29 | −17.4861 | 0.7915 | 1.85478 | 24.80 |
| 30 | 56.7446 | 3.2223 | 1.49700 | 81.54 |
| 31 | −19.8211 | 13.5943 | | |
| 32 | 89.4278 | 4.7268 | 1.49700 | 81.54 |
| 33 | −40.5134 | DD[33] | | |
| 34 | 85.5280 | 2.6501 | 1.89286 | 20.36 |
| 35 | −229.9919 | 12.2946 | | |
| 36 | ∞ | 49.9717 | 1.51633 | 64.14 |
| 37 | ∞ | | | |

TABLE 2

EXAMPLE 1·SPECIFICATION (d LINE)

| | WIDE-ANGLE END | TELEPHOTO END |
|---|---|---|
| ZOOM RATIO | 1.00 | 1.10 |
| f | −4.47 | −4.92 |
| Bf | 45.2 | 45.2 |
| FNo. | 2.51 | 2.57 |
| 2ω [°] | 131.6 | 127.2 |

TABLE 3

EXAMPLE 1·SURFACE SPACING

| | WIDE-ANGLE END | TELEPHOTO END |
|---|---|---|
| DD[18] | 24.4140 | 25.9129 |
| DD[20] | 38.0764 | 36.5775 |
| DD[24] | 25.9106 | 21.2419 |
| DD[33] | 0.2266 | 4.8953 |

TABLE 4

EXAMPLE 1·ASPHERIC COEFFICIENT

| SURFACE NUMBER | 1 | 2 | 3 |
|---|---|---|---|
| KA | −1.50000086E+01 | −8.31385527E−01 | −1.95464309E+00 |
| A3 | 5.01929360E−04 | 1.53977332E−03 | 1.02172065E−03 |
| A4 | 1.38132597E−05 | −1.68047369E−04 | 1.05704085E−05 |
| A5 | −1.74931716E−06 | 6.69260792E−05 | 2.45479390E−07 |
| A6 | 4.50689237E−08 | −1.13366374E−05 | −5.04698448E−08 |
| A7 | 1.14607389E−09 | 1.33469044E−06 | −3.54716715E−09 |
| A8 | −5.76238352E−11 | −1.11950685E−07 | −2.00692763E−10 |
| A9 | 3.61174201E−13 | 6.69024627E−09 | −2.18177890E−11 |
| A10 | 4.98519587E−14 | −2.95032046E−10 | 1.61236862E−12 |
| A11 | −2.73500472E−16 | 9.35099271E−12 | |
| A12 | −7.53124330E−18 | −2.11795922E−13 | |
| A13 | −1.75977015E−18 | 3.57366986E−15 | |
| A14 | −2.60764177E−20 | −5.48263535E−19 | |
| A15 | −1.27604915E−21 | 4.44351330E−18 | |
| A16 | 1.78392429E−22 | −1.13228929E−18 | |

| SURFACE NUMBER | 4 | 17 | 18 |
|---|---|---|---|
| KA | −2.93015082E+00 | −1.49999967E+01 | −9.24369329E+00 |
| A3 | 8.74365482E−04 | −1.95546323E−04 | −4.88499062E−04 |
| A4 | 2.26749731E−04 | 1.16584588E−04 | 1.42742966E−04 |
| A5 | −8.54358372E−07 | −1.39306290E−05 | −5.79983875E−06 |
| A6 | 3.21228247E−07 | 1.57100873E−06 | −9.12083965E−07 |
| A7 | 3.42075492E−08 | −3.72222158E−07 | 1.20287408E−07 |
| A8 | 2.31646985E−09 | 5.22467014E−08 | −7.86787342E−09 |
| A9 | 3.28387849E−10 | −3.52172210E−09 | 5.17308199E−10 |
| A10 | 4.55020378E−11 | 6.26440075E−11 | −2.27548921E−11 |
| A11 | | 3.34910326E−12 | 8.49381154E−14 |
| A12 | | 2.08831868E−13 | 9.90287078E−16 |
| A13 | | −4.71267496E−14 | 1.87937473E−15 |
| A14 | | 2.32649081E−15 | −1.19028837E−16 |
| A15 | | −4.34122970E−17 | 3.07675073E−18 |
| A16 | | 4.79710082E−19 | 1.56365692E−19 |

Figure 10:
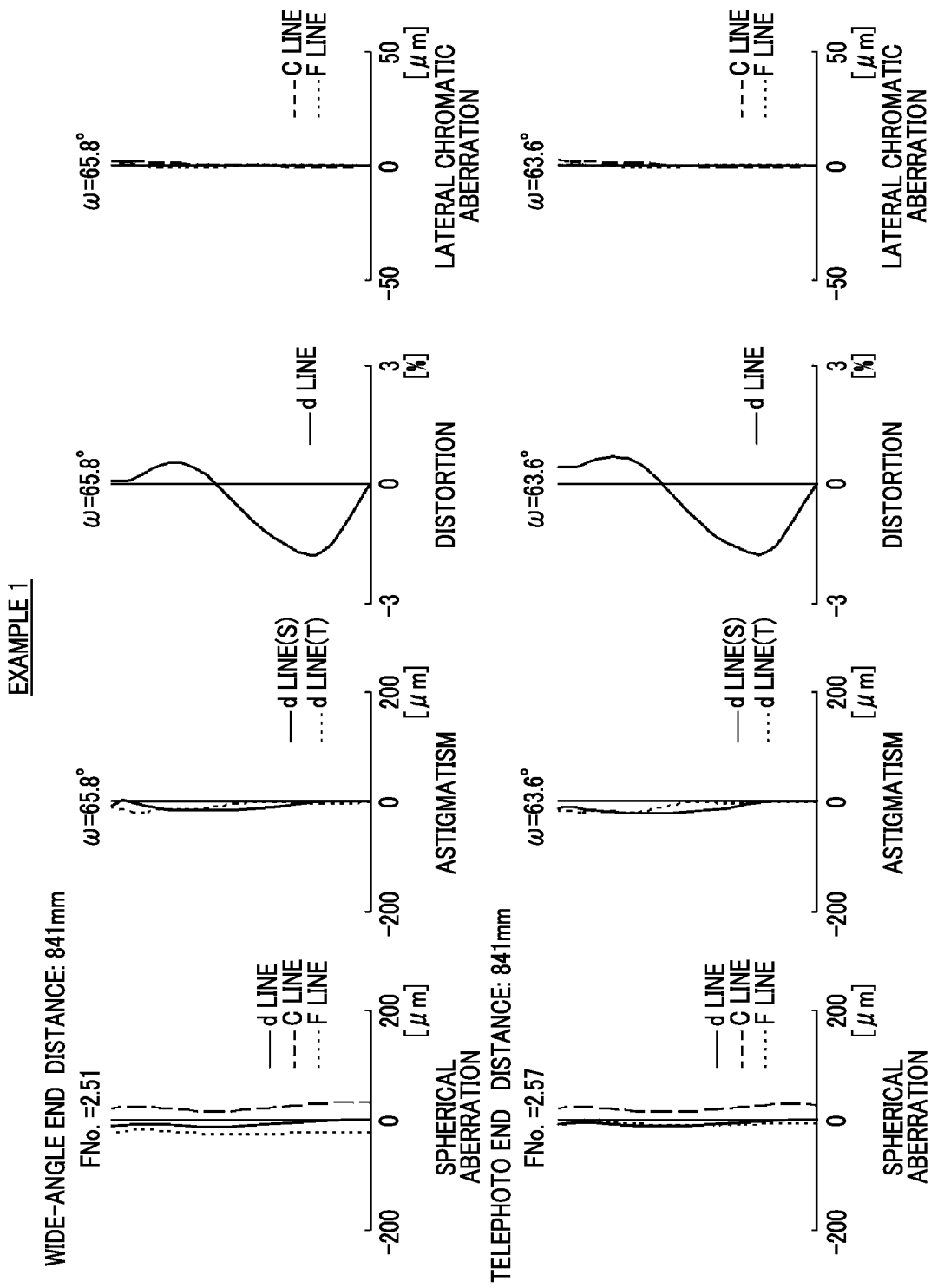
FIG. 10 is a diagram of aberrations of the zoom lens of Example 1 of the present invention.

FIG. 10 shows aberration diagrams of the zoom lens of Example 1. In addition, in order from the upper left side of FIG. 10, spherical aberration, astigmatism, distortion, and lateral chromatic aberration at the wide-angle end are shown. In order from the lower left side of FIG. 10, spherical aberration, astigmatism, distortion, and lateral chromatic aberration at the telephoto end are shown. These aberration diagrams show states in a case where the projection distance is set as distances noted in the aberration diagrams. The aberration diagrams illustrating spherical aberration, astigmatism, and distortion indicate aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (wavelength 656.3 nm) and F line (wavelength 486.1 nm) are respectively indicated by the long dashed line and the short dashed line. In the spherical aberration diagram, FNo. means an F number. In the other aberration diagrams, ω means a half angle of view.

Reference signs, meanings, and description methods of the respective data pieces according to Example 1 described above are the same as those in the following examples unless otherwise noted. Therefore, in the following description, repeated description will be omitted.

Figure 2:
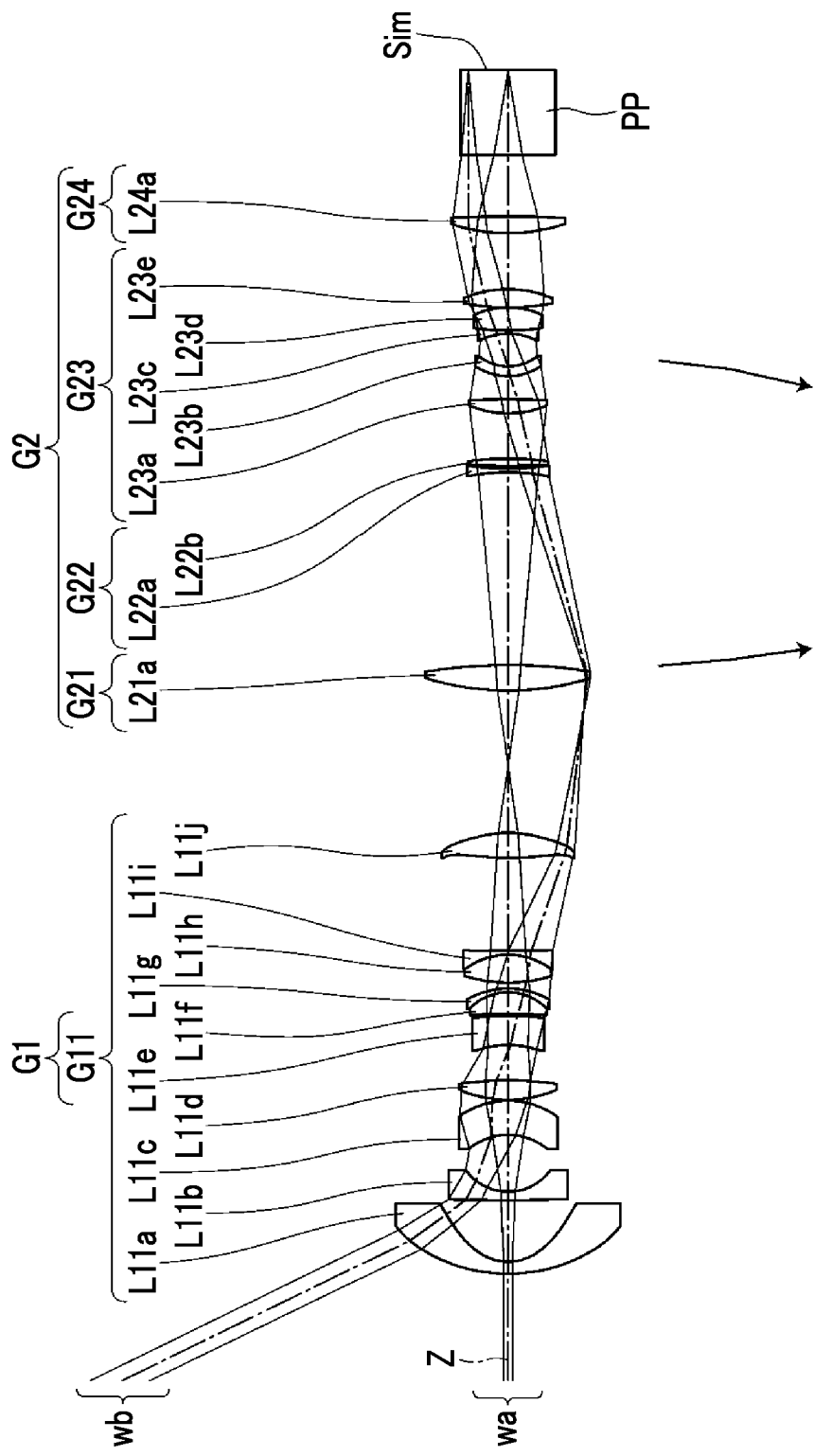
FIG. 2 is a cross-sectional view illustrating a configuration of a zoom lens of Example 2 of the present invention.
Figure 11:
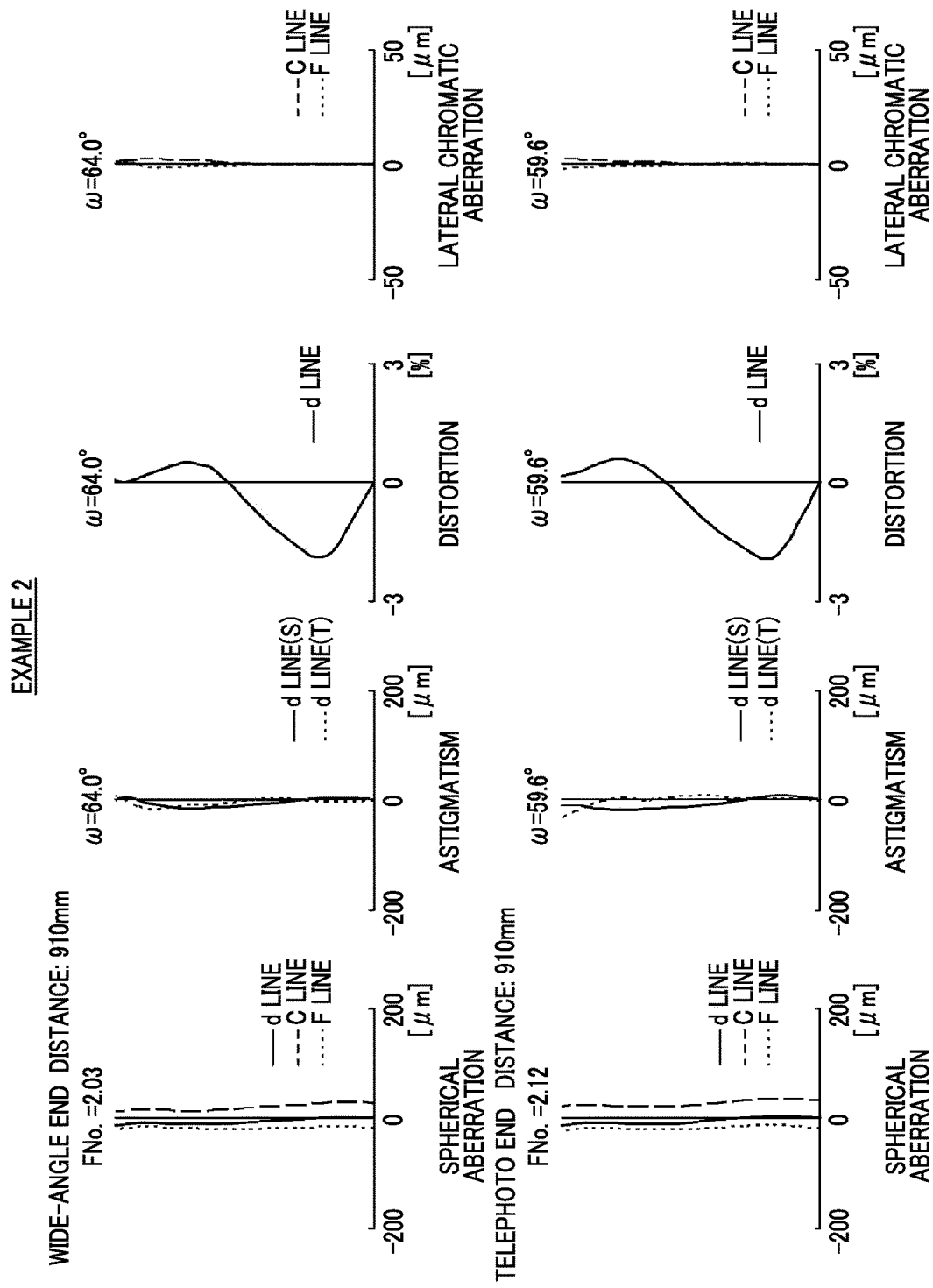
FIG. 11 is a diagram of aberrations of the zoom lens of Example 2 of the present invention.

Next, a zoom lens of Example 2 will be described. FIG. 2 is a cross-sectional diagram illustrating a configuration of the zoom lens of Example 2. The zoom lens of Example 2 has the same lens groups and has the same number of lenses as that of Example 1. Table 5 shows lens data of the zoom lens of Example 2, Table 6 shows data about specification, Table 7 shows surface spacings which are variable during zooming, Table 8 shows data about aspheric coefficients thereof, and FIG. 11 shows aberration diagrams.

TABLE 5

EXAMPLE 2·LENS DATA (n AND ν ARE BASED ON d LINE)

| SURFACE NUMBER | RADIUS OF CURVATURE | SURFACE SPACING | n | ν |
|---|---|---|---|---|
| *1 | 47.5802 | 3.0043 | 1.58313 | 59.46 |
| *2 | 12.3786 | 15.4784 | | |
| 3 | 507.2900 | 2.1459 | 1.74400 | 44.79 |
| 4 | 12.9869 | 14.3243 | | |
| 5 | −15.3010 | 8.5845 | 1.85150 | 40.78 |
| 6 | −21.0742 | 0.2575 | | |
| 7 | 31.8504 | 4.8775 | 1.85150 | 40.78 |
| 8 | −81.5108 | 8.8838 | | |
| 9 | −23.2547 | 7.3793 | 1.64769 | 33.79 |
| 10 | −67.1387 | 0.4262 | | |
| 11 | −165.7439 | 5.4634 | 1.49700 | 81.61 |
| 12 | −13.4214 | 0.9320 | 1.56732 | 42.82 |
| 13 | −20.8682 | 1.5089 | | |
| 14 | 36.6796 | 7.0167 | 1.49700 | 81.61 |
| 15 | −17.7412 | 1.0021 | 1.84666 | 23.78 |
| 16 | 833.0951 | 23.3711 | | |
| *17 | 68.6043 | 6.2918 | 1.58313 | 59.46 |
| *18 | −27.4933 | DD[18] | | |
| 19 | 70.8919 | 6.4257 | 1.84666 | 23.78 |
| 20 | −131.4990 | DD[20] | | |
| 21 | −49.7914 | 0.9352 | 1.51633 | 64.14 |
| 22 | 71.2349 | 0.6338 | | |
| 23 | 326.5847 | 1.8753 | 1.84666 | 23.78 |
| 24 | −78.8062 | DD[24] | | |
| 25 | 25.2894 | 3.5334 | 1.59522 | 67.73 |
| 26 | −199.8327 | 5.8321 | | |
| 27 | 14.7794 | 2.4604 | 1.53172 | 48.84 |
| 28 | 11.7195 | 8.2505 | | |
| 29 | −15.4939 | 0.7873 | 1.84666 | 23.78 |
| 30 | 62.5818 | 5.7561 | 1.49700 | 81.61 |
| 31 | −21.2039 | 0.0250 | | |
| 32 | 62.5352 | 4.6047 | 1.49700 | 81.61 |
| 33 | −28.4246 | DD[33] | | |
| 34 | 46.1305 | 4.2014 | 1.89286 | 20.36 |
| 35 | −311.3375 | 15.4506 | | |
| 36 | ∞ | 21.4592 | 1.51633 | 64.14 |
| 37 | ∞ | | | |

TABLE 6

EXAMPLE 2·SPECIFICATION (d LINE)

| | WIDE-ANGLE END | TELEPHOTO END |
|---|---|---|
| ZOOM RATIO | 1.00 | 1.20 |
| f' | −4.87 | −5.84 |
| Bf | 29.6 | 29.6 |
| FNo. | 2.03 | 2.12 |
| 2ω [°] | 128.0 | 119.2 |

TABLE 7

EXAMPLE 2·SURFACE SPACING

| | WIDE-ANGLE END | TELEPHOTO END |
|---|---|---|
| DD[18] | 35.6130 | 40.0843 |
| DD[20] | 48.7160 | 44.2447 |
| DD[24] | 11.3870 | 4.6440 |
| DD[33] | 14.1231 | 20.8661 |

TABLE 8

EXAMPLE 2·ASPHERIC COEFFICIENT

| SURFACE NUMBER | 1 | 2 | 17 |
|---|---|---|---|
| KA | −1.68176150E−06 | −1.23323305E−01 | −1.49999937E+01 |
| A3 | 5.38680509E−05 | 7.73967900E−04 | −2.82676642E−04 |
| A4 | 1.80103419E−05 | −1.93634763E−04 | 7.84311318E−05 |
| A5 | −1.43126166E−06 | 5.10201098E−05 | −8.69897276E−06 |
| A6 | 2.85483299E−08 | −7.66400884E−06 | 1.09555597E−06 |
| A7 | 8.50659556E−10 | 8.21651063E−07 | −2.33651340E−07 |
| A8 | −3.53627008E−11 | −6.38133075E−08 | 3.00197548E−08 |
| A9 | 7.92523988E−14 | 3.55356724E−09 | −1.87398554E−09 |
| A10 | 1.94947299E−14 | −1.43779627E−10 | 3.04303353E−11 |
| A11 | −2.83282854E−16 | 4.35728573E−12 | 1.53298945E−12 |
| A12 | −5.06046815E−18 | −9.31997185E−14 | 8.94847802E−14 |
| A13 | 1.03163644E−19 | 1.32350621E−15 | −1.82349008E−14 |
| A14 | −5.02349790E−21 | −2.02133678E−17 | 8.31005763E−16 |
| A15 | 3.85356583E−23 | −3.65242046E−19 | −1.46593312E−17 |
| A16 | 5.91469675E−24 | 2.00267739E−20 | 7.34117420E−20 |

| SURFACE NUMBER | 18 |
|---|---|
| KA | −1.10861776E+00 |
| A3 | −4.11006138E−04 |
| A4 | 1.08786108E−04 |
| A5 | −3.29483081E−06 |
| A6 | −6.55013227E−07 |
| A7 | 7.38911402E−08 |
| A8 | −4.55402877E−09 |
| A9 | 2.77830986E−10 |
| A10 | −1.13089943E−11 |
| A11 | 2.04604940E−14 |
| A12 | 6.99647396E−16 |
| A13 | 8.87223273E−16 |
| A14 | −5.00308454E−17 |
| A15 | 1.31688245E−18 |
| A16 | −1.82682511E−20 |

Figure 3:
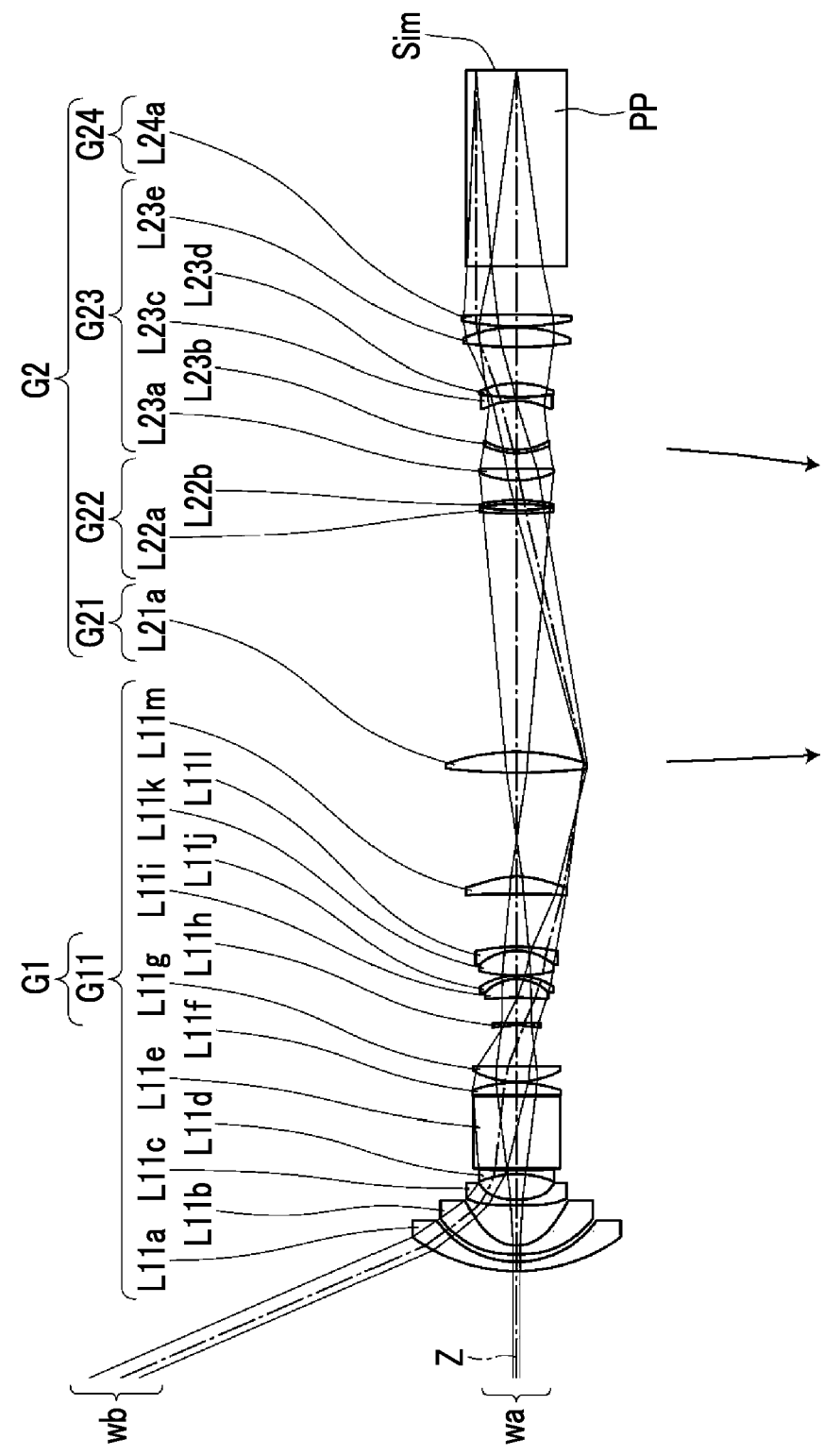
FIG. 3 is a cross-sectional view illustrating a configuration of a zoom lens of Example 3 of the present invention.
Figure 12:
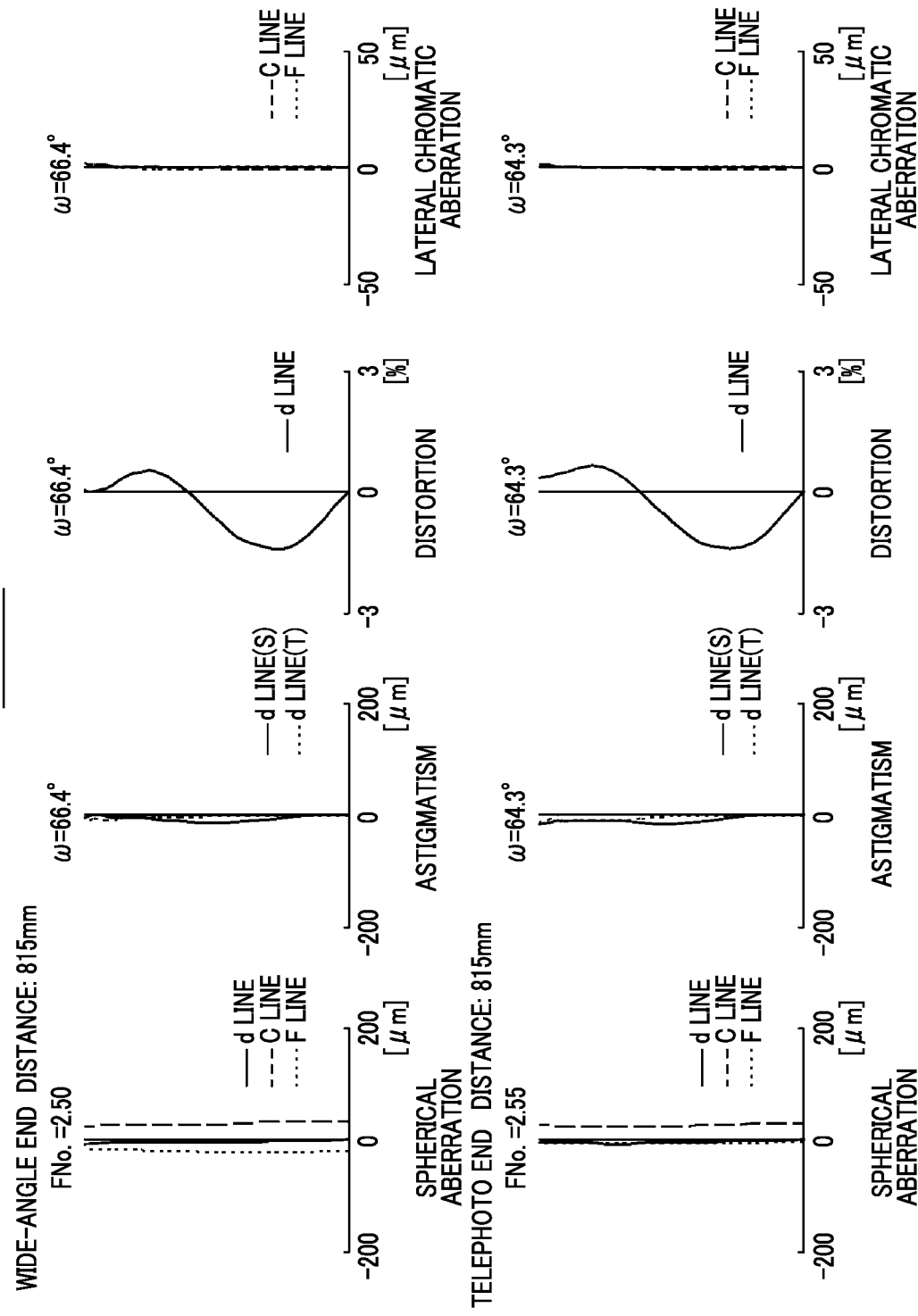
FIG. 12 is a diagram of aberrations of the zoom lens of Example 3 of the present invention.

Next, a zoom lens of Example 3 will be described. FIG. 3 is a cross-sectional diagram illustrating a configuration of the zoom lens of Example 3. The zoom lens of Example 3 has the same lens groups and has the same number of lenses as that of Example 1 except that the first-1 lens group G11 includes thirteen lenses as the lenses L11a to L11m. Table 9 shows lens data of the zoom lens of Example 3, Table 10 shows data about specification, Table 11 shows surface spacings which are variable during zooming, Table 12 shows data about aspheric coefficients thereof, and FIG. 12 shows aberration diagrams.

TABLE 9

EXAMPLE 3·LENS DATA (n AND ν ARE BASED ON d LINE)

| SURFACE NUMBER | RADIUS OF CURVATURE | SURFACE SPACING | n | ν |
|---|---|---|---|---|
| 1 | 43.5493 | 2.3077 | 1.48749 | 70.24 |
| 2 | 24.1070 | 1.8717 | | |
| *3 | 101.3646 | 2.1978 | 1.74320 | 49.29 |
| *4 | 10.7995 | 9.9458 | | |
| *5 | 357.4973 | 1.3738 | 1.80610 | 40.88 |
| *6 | 23.4037 | 6.2835 | | |
| 7 | −23.8538 | 0.9143 | 1.80610 | 33.27 |
| 8 | 150.0660 | 0.5495 | | |
| 9 | ∞ | 17.5824 | 1.56883 | 56.04 |
| 10 | ∞ | 0.2747 | | |
| 11 | 775.0687 | 3.0934 | 1.77250 | 49.60 |
| 12 | −32.7611 | 0.2203 | | |
| 13 | 22.5698 | 3.7803 | 1.85150 | 40.78 |
| 14 | 1455.2083 | 10.1488 | | |
| 15 | −30.0176 | 0.6430 | 1.89286 | 20.36 |
| 16 | −152.5180 | 6.1958 | | |
| 17 | −98.5244 | 4.5702 | 1.49700 | 81.54 |
| 18 | −10.8481 | 0.0169 | | |

TABLE 9-continued

EXAMPLE 3·LENS DATA (n AND ν ARE BASED ON d LINE)

| SURFACE NUMBER | RADIUS OF CURVATURE | SURFACE SPACING | n | ν |
|---|---|---|---|---|
| 19 | −10.8928 | 0.8802 | 1.85478 | 24.80 |
| 20 | −16.2185 | 0.0165 | | |
| 21 | 39.2965 | 6.1385 | 1.49700 | 81.54 |
| 22 | −13.9443 | 0.0160 | | |
| 23 | −13.9005 | 0.9716 | 1.85478 | 24.80 |
| 24 | −49.1119 | 12.9800 | | |
| *25 | −691.1619 | 4.4427 | 1.69350 | 53.18 |
| *26 | −18.8279 | DD[26] | | |
| 27 | 152.3088 | 5.1721 | 1.85478 | 24.80 |
| 28 | −52.1033 | DD[28] | | |
| 29 | 83.1611 | 0.8704 | 1.48749 | 70.24 |
| 30 | 51.7564 | 1.6021 | | |
| 31 | −46.4623 | 0.9161 | 1.85478 | 24.80 |
| 32 | −40.3936 | DD[32] | | |
| 33 | 23.2382 | 2.9106 | 1.59522 | 67.73 |
| 34 | −491.4993 | 3.8628 | | |
| 35 | 19.2688 | 0.7994 | 1.51742 | 52.43 |
| 36 | 15.2182 | 12.0631 | | |
| 37 | −17.9318 | 0.8558 | 1.85478 | 24.80 |
| 38 | 51.5347 | 0.1436 | | |
| 39 | 64.2360 | 3.3616 | 1.49700 | 81.54 |
| 40 | −23.2884 | 8.7646 | | |
| 41 | 95.0966 | 4.8923 | 1.49700 | 81.54 |
| 42 | −33.3077 | DD[42] | | |
| 43 | 66.3144 | 2.9233 | 1.89286 | 20.36 |
| 44 | −295.6039 | 11.9231 | | |
| 45 | ∞ | 48.4615 | 1.51680 | 64.20 |
| 46 | ∞ | | | |

TABLE 10

EXAMPLE 3·SPECIFICATION (d LINE)

|  | WIDE-ANGLE END | TELEPHOTO END |
|---|---|---|
| ZOOM RATIO | 1.00 | 1.10 |
| f' | −4.35 | −4.79 |
| Bf' | 43.9 | 43.9 |
| FNo. | 2.50 | 2.55 |
| 2ω [°] | 132.8 | 128.6 |

TABLE 11

EXAMPLE 3·SURFACE SPACING

|  | WIDE-ANGLE END | TELEPHOTO END |
|---|---|---|
| DD[26] | 25.5972 | 27.3540 |
| DD[28] | 59.0377 | 57.2809 |
| DD[32] | 4.8618 | 0.4992 |
| DD[42] | 0.2198 | 4.5824 |

TABLE 12

EXAMPLE 3·ASPHERIC COEFFICIENT

| SURFACE NUMBER | 3 | 4 | 5 |
|---|---|---|---|
| KA | −1.50000071E+01 | −1.45763118E+00 | −5.47743184E−10 |
| A3 | 1.72541065E−03 | 2.76812132E−03 | −2.63242548E−04 |
| A4 | −4.24969876E−05 | −2.20374222E−04 | 9.30990513E−05 |
| A5 | −5.97245915E−07 | 7.69792189E−05 | 9.43532209E−07 |
| A6 | 4.10131203E−08 | −1.32170292E−05 | −6.02404201E−08 |
| A7 | 1.90831798E−09 | 1.59936118E−06 | −5.25720572E−09 |
| A8 | −8.63903318E−11 | −1.39050584E−07 | −1.90819538E−10 |
| A9 | 1.21707219E−13 | 8.53877310E−09 | −2.20907430E−11 |
| A10 | 6.28878325E−14 | −3.87985050E−10 | 1.85294677E−12 |
| A11 | 1.62628588E−15 | 1.26450977E−11 |  |
| A12 | 1.34014845E−16 | −3.01636139E−13 |  |
| A13 | −7.99217866E−19 | 5.32878522E−15 |  |
| A14 | 1.28358554E−19 | 1.80832567E−17 |  |
| A15 | −1.54778274E−20 | 9.47442476E−18 |  |
| A16 | −1.09959335E−21 | −9.10531003E−19 |  |

| SURFACE NUMBER | 6 | 25 | 26 |
|---|---|---|---|
| KA | −6.53474487E+00 | −1.50000000E+01 | −3.07827839E+00 |
| A3 | −3.85781180E−04 | −3.67099153E−04 | −6.25084975E−04 |
| A4 | 3.40100586E−04 | 1.37926706E−04 | 1.65567430E−04 |
| A5 | −8.16694721E−06 | −1.50292427E−05 | −6.51135648E−06 |
| A6 | 6.31721044E−07 | 1.80733843E−06 | −1.05697263E−06 |
| A7 | 4.95658193E−08 | −4.48674992E−07 | 1.46130183E−07 |
| A8 | −1.96030757E−09 | 6.50122640E−08 | −9.59477425E−09 |
| A9 | −1.38171511E−10 | −4.49919122E−09 | 6.67402263E−10 |
| A10 | 9.12873089E−11 | 8.27736814E−11 | −3.05068004E−11 |
| A11 |  | 4.45815737E−12 | 8.79822062E−14 |
| A12 |  | 2.87436082E−13 | −1.55539149E−15 |
| A13 |  | −6.81163715E−14 | 2.08467541E−15 |
| A14 |  | 3.41930206E−15 | −1.93361421E−16 |
| A15 |  | −7.03201486E−17 | 4.34160581E−18 |
| A16 |  | 1.39841293E−18 | 6.02579429E−19 |

Figure 4:
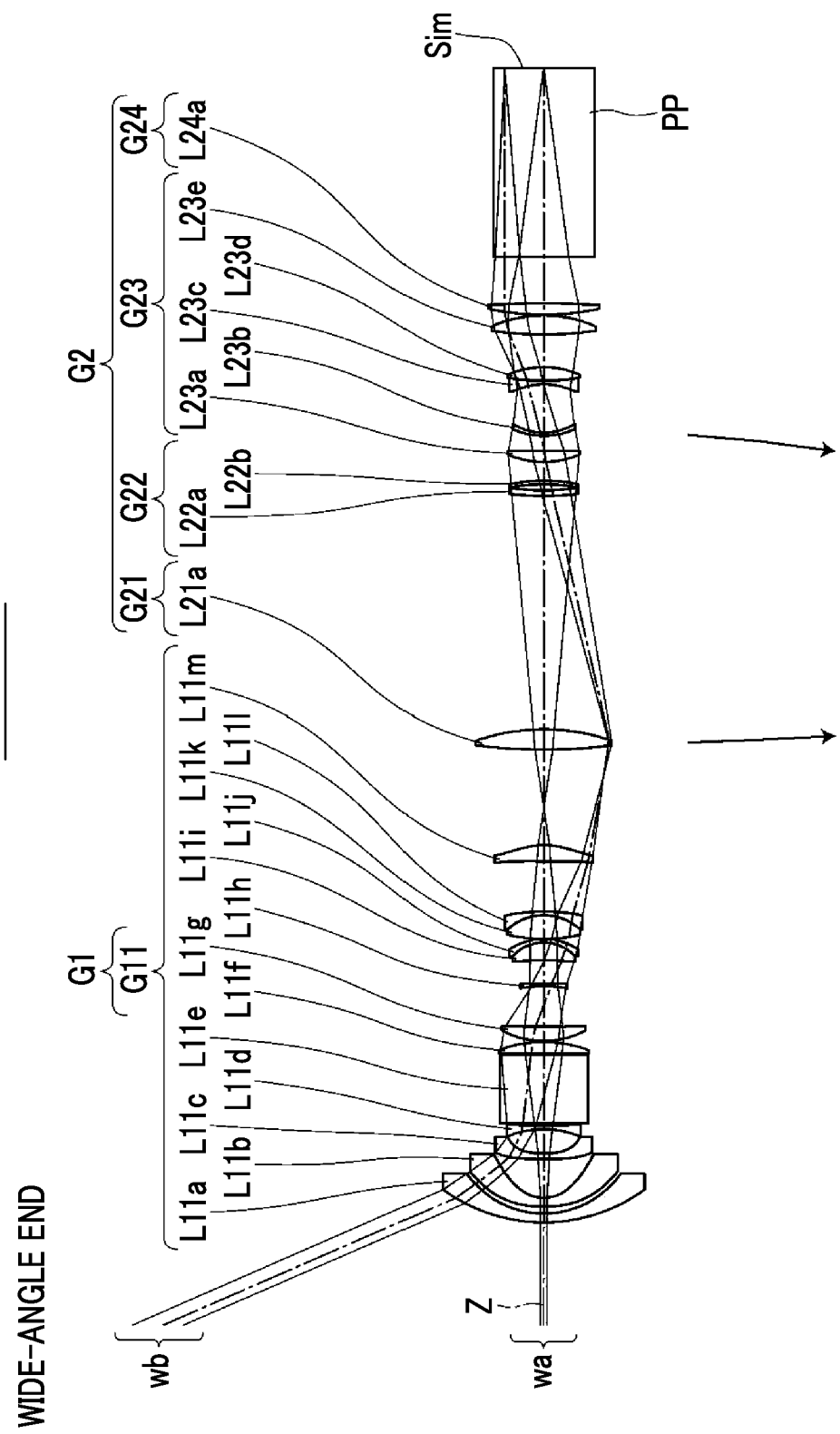
FIG. 4 is a cross-sectional view illustrating a configuration of a zoom lens of Example 4 of the present invention.
Figure 13:
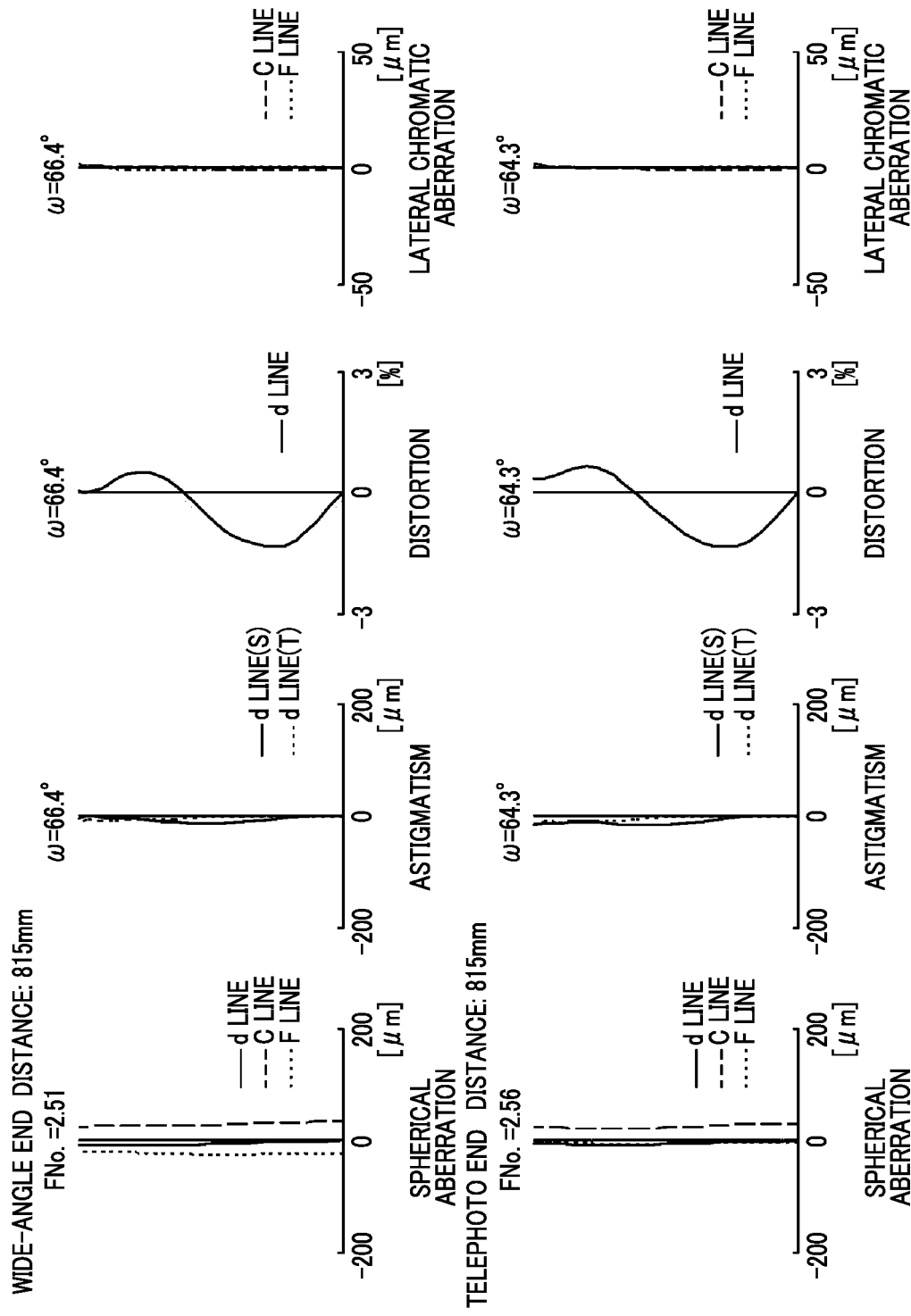
FIG. 13 is a diagram of aberrations of the zoom lens of Example 4 of the present invention.

Next, a zoom lens of Example 4 will be described. FIG. 4 is a cross-sectional diagram illustrating a configuration of the zoom lens of Example 4. The zoom lens of Example 4 has the same lens groups and has the same number of lenses as that of Example 3. Table 13 shows lens data of the zoom lens of Example 4, Table 14 shows data about specification, Table 15 shows surface spacings which are variable during zooming, Table 16 shows data about aspheric coefficients thereof, and FIG. 13 shows aberration diagrams.

TABLE 13

EXAMPLE 4·LENS DATA (n AND ν ARE BASED ON d LINE)

| SURFACE NUMBER | RADIUS OF CURVATURE | SURFACE SPACING | n | ν |
|---|---|---|---|---|
| 1 | 43.8581 | 2.3077 | 1.48749 | 70.24 |
| 2 | 24.1068 | 1.8638 |  |  |
| *3 | 99.7929 | 2.1978 | 1.74320 | 49.29 |
| *4 | 10.8115 | 9.9839 |  |  |
| *5 | 312.1093 | 1.3738 | 1.80610 | 40.88 |
| *6 | 23.2178 | 6.2608 |  |  |
| 7 | −24.0318 | 0.9157 | 1.80610 | 33.27 |
| 8 | 147.8776 | 0.5495 |  |  |
| 9 | ∞ | 17.5824 | 1.56883 | 56.04 |
| 10 | ∞ | 0.2747 |  |  |
| 11 | 643.0312 | 3.1011 | 1.77250 | 49.60 |
| 12 | −32.7815 | 0.2203 |  |  |
| 13 | 22.4774 | 3.7403 | 1.85150 | 40.78 |
| 14 | 854.0630 | 10.3939 |  |  |
| 15 | −29.6332 | 0.6429 | 1.89286 | 20.36 |
| 16 | −154.5876 | 5.9314 |  |  |
| 17 | −110.0067 | 4.6063 | 1.49700 | 81.54 |
| 18 | −10.7828 | 0.0169 |  |  |

TABLE 13-continued

EXAMPLE 4·LENS DATA (n AND ν ARE BASED ON d LINE)

| SURFACE NUMBER | RADIUS OF CURVATURE | SURFACE SPACING | n | ν |
|---|---|---|---|---|
| 19 | −10.8267 | 0.8801 | 1.85478 | 24.80 |
| 20 | −16.1231 | 0.0165 |  |  |
| 21 | 40.4879 | 6.0849 | 1.49700 | 81.54 |
| 22 | −13.8698 | 0.0160 |  |  |
| 23 | −13.8260 | 0.9716 | 1.85478 | 24.80 |

TABLE 13-continued

EXAMPLE 4·LENS DATA (n AND ν ARE BASED ON d LINE)

| SURFACE NUMBER | RADIUS OF CURVATURE | SURFACE SPACING | n | ν |
|---|---|---|---|---|
| 24 | −48.7780 | 12.8896 | | |
| *25 | −339.5718 | 4.1532 | 1.69350 | 53.18 |
| *26 | −18.9154 | DD[26] | | |
| 27 | 133.8577 | 5.2489 | 1.85478 | 24.80 |
| 28 | −53.3777 | DD[28] | | |
| 29 | 81.8394 | 1.4114 | 1.48749 | 70.24 |
| 30 | 53.0999 | 1.5397 | | |
| 31 | −49.3236 | 0.9294 | 1.85478 | 24.80 |
| 32 | −41.9046 | DD[32] | | |
| 33 | 23.2935 | 2.8683 | 1.59522 | 67.73 |
| 34 | −805.7511 | 3.8628 | | |
| 35 | 19.1716 | 0.8009 | 1.51742 | 52.43 |
| 36 | 15.0758 | 12.4332 | | |
| 37 | −17.9206 | 0.8641 | 1.85478 | 24.80 |
| 38 | 54.8697 | 0.1362 | | |
| 39 | 68.3061 | 3.3992 | 1.49700 | 81.54 |
| 40 | −23.1309 | 8.4139 | | |
| 41 | 96.6197 | 4.8727 | 1.49700 | 81.54 |
| 42 | −33.1682 | DD[42] | | |
| 43 | 69.3541 | 2.9119 | 1.89286 | 20.36 |
| 44 | −244.5488 | 11.9231 | | |
| 45 | ∞ | 48.4615 | 1.51680 | 64.20 |
| 46 | ∞ | | | |

TABLE 14

EXAMPLE 4·SPECIFICATION (d LINE)

| | WIDE-ANGLE END | TELEPHOTO END |
|---|---|---|
| ZOOM RATIO | 1.00 | 1.10 |
| f' | −4.35 | −4.79 |
| Bf' | 43.9 | 43.9 |
| FNo. | 2.51 | 2.56 |
| 2ω [°] | 132.8 | 128.6 |

TABLE 15

EXAMPLE 4·SURFACE SPACING

| | WIDE-ANGLE END | TELEPHOTO END |
|---|---|---|
| DD[26] | 24.5380 | 26.2860 |
| DD[28] | 60.0031 | 58.2551 |
| DD[32] | 4.8397 | 0.5151 |
| DD[42] | 0.2198 | 4.5444 |

TABLE 16

EXAMPLE 4·ASPHERIC COEFFICIENT

| SURFACE NUMBER | 3 | 4 | 5 |
|---|---|---|---|
| KA | −1.50000071E+01 | −1.46220183E+00 | −5.47743184E−10 |
| A3 | 1.71484030E−03 | 2.72911736E−03 | −3.13017512E−04 |
| A4 | −4.11395235E−05 | −2.15539855E−04 | 9.43727732E−05 |
| A5 | −6.38500744E−07 | 7.69052208E−05 | 9.46787952E−07 |
| A6 | 4.04645467E−08 | −1.32172888E−05 | −5.95917946E−08 |
| A7 | 1.90962903E−09 | 1.59940465E−06 | −5.25693337E−09 |
| A8 | −8.66290220E−11 | −1.39056391E−07 | −1.87701357E−10 |
| A9 | 9.68688450E−14 | 8.53846905E−09 | −2.21297868E−11 |
| A10 | 6.22805048E−14 | −3.88055363E−10 | 1.88147654E−12 |
| A11 | 1.89486328E−15 | 1.26449909E−11 | |
| A12 | 1.34392491E−16 | −3.02507399E−13 | |
| A13 | −7.07915910E−19 | 5.29743662E−15 | |
| A14 | 1.37329244E−19 | 1.94298977E−17 | |
| A15 | −1.57036109E−20 | 9.66599401E−18 | |
| A16 | −1.16232148E−21 | −8.94015117E−19 | |

| SURFACE NUMBER | 6 | 25 | 26 |
|---|---|---|---|
| KA | −6.75667650E+00 | −1.50000000E+01 | −3.04189306E+00 |
| A3 | −4.25165458E−04 | −3.66323886E−04 | −6.02392573E−04 |
| A4 | 3.43413832E−04 | 1.39035404E−04 | 1.60626724E−04 |
| A5 | −8.77096432E−06 | −1.51276024E−05 | −6.26977468E−06 |
| A6 | 6.42749465E−07 | 1.81908439E−06 | −1.04895752E−06 |
| A7 | 4.99480300E−08 | −4.48199844E−07 | 1.46325653E−07 |
| A8 | −1.89607609E−09 | 6.50194929E−08 | −9.56198249E−09 |
| A9 | −1.50870135E−10 | −4.49914469E−09 | 6.67408850E−10 |
| A10 | 8.84648690E−11 | 8.26978000E−11 | −3.05606763E−11 |
| A11 | | 4.45729554E−12 | 7.81889727E−14 |
| A12 | | 2.87679858E−13 | −2.43183544E−15 |
| A13 | | −6.81023304E−14 | 2.03937282E−15 |
| A14 | | 3.41875911E−15 | −1.89842278E−16 |
| A15 | | −7.05435662E−17 | 4.77011810E−18 |
| A16 | | 1.40699213E−18 | 6.01037747E−19 |

Figure 5:
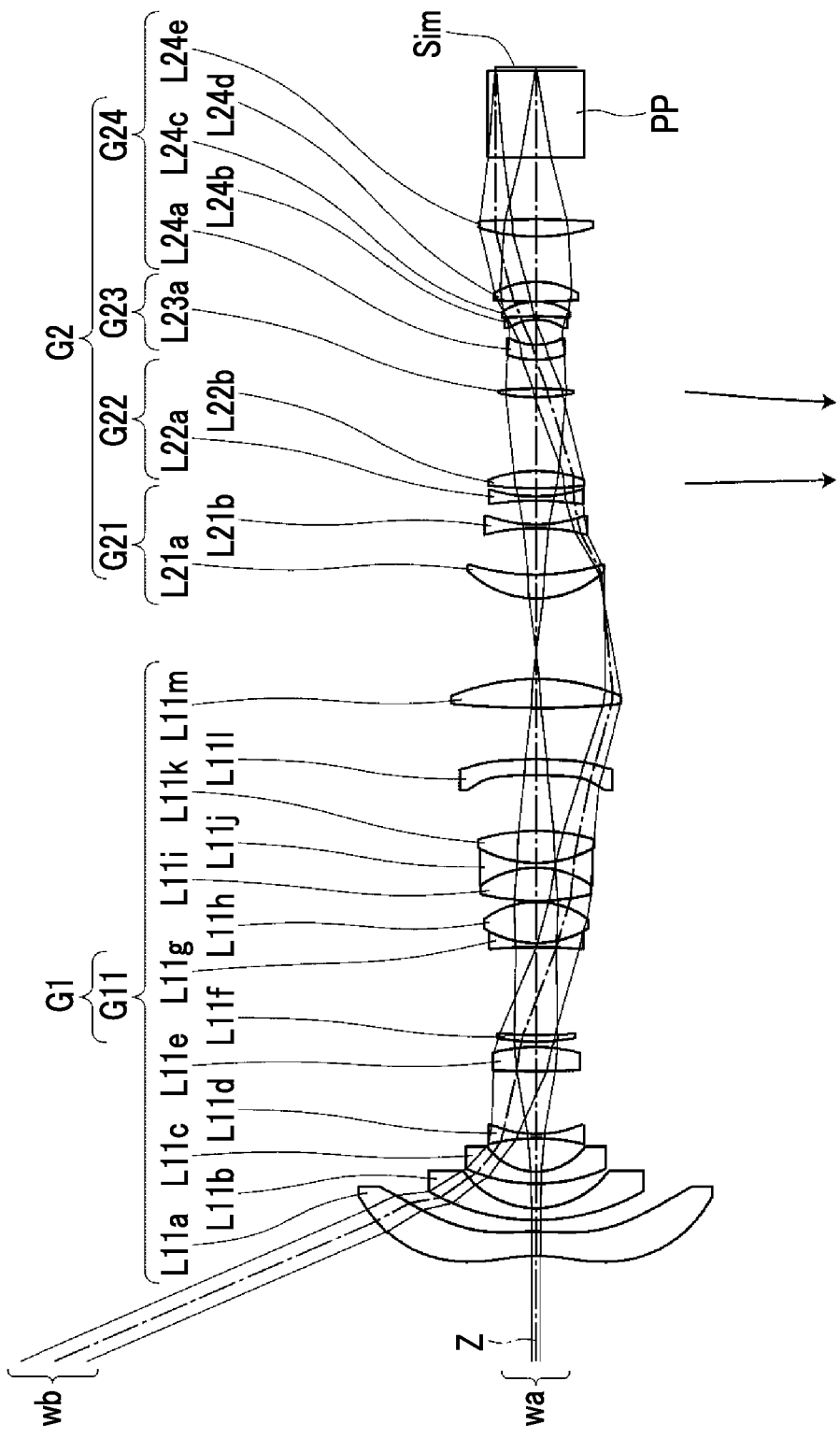
FIG. 5 is a cross-sectional view illustrating a configuration of a zoom lens of Example 5 of the present invention.

Next, a zoom lens of Example 5 will be described. FIG. 5 is a cross-sectional diagram illustrating a configuration of the zoom lens of Example 5.

The zoom lens of Example 5 includes a first optical system G1 on the magnification side, and a second optical system G2 on the reduction side, in a state where the intermediate image is formed therebetween. The first optical system G1 includes only a first-1 lens group G11. The second optical system G2 includes a second-1 lens group G21, a second-2 lens group G22, a second-3 lens group G23, and a second-4 lens group G24.

The first-1 lens group G11, the second-1 lens group G21, and the second-4 lens group G24 remain stationary with respect to the reduction side imaging plane (image display surface Sim) during zooming. The second-2 lens group G22 and the second-3 lens group G23 are configured to move by changing spacings of the groups adjacent to each other in the direction of the optical axis during zooming.

The first-1 lens group G11 includes thirteen lenses as lenses L11a to L11m. The second-1 lens group G21 includes two lenses as lenses L21a and L21b. The second-2 lens group G22 includes two lenses as lenses L22a and L22b. The second-3 lens group G23 includes one lens as only a lens L23a. The second-4 lens group G24 includes five lenses as lenses L24a to L24e.

Figure 14:
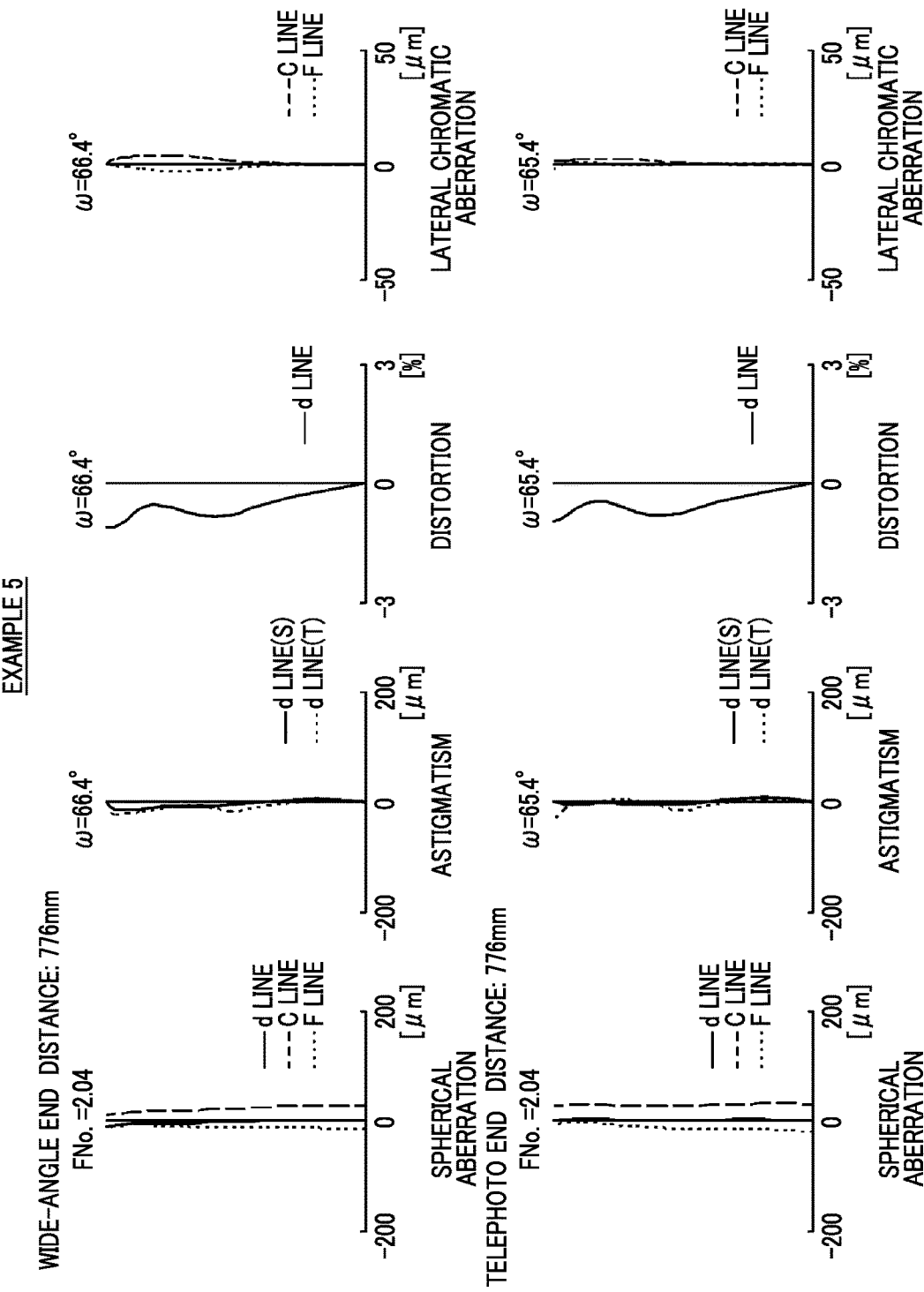
FIG. 14 is a diagram of aberrations of the zoom lens of Example 5 of the present invention.

Table 17 shows lens data of the zoom lens of Example 5, Table 18 shows data about specification, Table 19 shows surface spacings which are variable during zooming, Table 20 shows data about aspheric coefficients thereof, and FIG. 14 shows aberration diagrams.

TABLE 17

EXAMPLE 5·LENS DATA (n AND ν ARE BASED ON d LINE)

| SURFACE NUMBER | RADIUS OF CURVATURE | SURFACE SPACING | n | ν |
|---|---|---|---|---|
| *1 | −26.8240 | 6.0086 | 1.49100 | 57.58 |
| *2 | −59.2748 | 2.8138 | | |
| 3 | 52.9296 | 3.0043 | 1.69680 | 55.53 |
| 4 | 22.2042 | 6.0647 | | |
| 5 | 42.0590 | 3.0036 | 1.91082 | 35.25 |
| 6 | 14.9726 | 8.2664 | | |
| 7 | −47.9718 | 1.0645 | 1.67790 | 55.34 |
| 8 | 27.1712 | 15.6322 | | |
| 9 | 268.3152 | 6.0036 | 1.83400 | 37.16 |
| 10 | −40.7551 | 1.3055 | | |
| 11 | 53.4106 | 1.7102 | 1.89286 | 20.36 |
| 12 | 148.6430 | 21.7774 | | |
| 13 | −119.7356 | 1.0736 | 1.71736 | 29.52 |
| 14 | 25.3756 | 10.1677 | 1.49700 | 81.61 |
| 15 | −21.6515 | 0.2582 | | |
| 16 | 57.7764 | 8.2329 | 1.69680 | 55.53 |
| 17 | −23.7210 | 1.2258 | 1.80518 | 25.46 |

TABLE 17-continued

EXAMPLE 5·LENS DATA (n AND ν ARE BASED ON d LINE)

| SURFACE NUMBER | RADIUS OF CURVATURE | SURFACE SPACING | n | ν |
|---|---|---|---|---|
| 18 | 29.4272 | 7.9439 | 1.49700 | 81.61 |
| 19 | −49.4104 | 13.8069 | | |
| *20 | −110.8875 | 4.0343 | 1.49100 | 57.58 |
| *21 | −61.6001 | 12.4615 | | |
| 22 | 209.2060 | 7.2319 | 1.80518 | 25.46 |
| 23 | −54.5602 | 20.0085 | | |
| 24 | 24.4135 | 5.9549 | 1.80518 | 25.46 |
| 25 | 55.5728 | 11.5380 | | |
| 26 | −49.0525 | 1.1338 | 1.51742 | 52.43 |
| 27 | 34.2822 | DD[27] | | |
| 28 | −78.1637 | 1.0449 | 1.51633 | 64.14 |
| 29 | 38.3681 | 2.0222 | | |
| 30 | 105.9424 | 4.2918 | 1.80400 | 46.58 |
| 31 | −33.3591 | DD[31] | | |
| 32 | 48.2116 | 2.1756 | 1.59282 | 68.62 |
| 33 | −82.4081 | DD[33] | | |
| 34 | 24.0877 | 3.7248 | 1.53172 | 48.84 |
| 35 | 14.7601 | 6.2461 | | |
| 36 | −11.8748 | 0.7742 | 1.80518 | 25.46 |
| 37 | −116.7602 | 3.6749 | 1.59282 | 68.62 |
| 38 | −15.2041 | 0.0264 | | |
| 39 | 174.9138 | 4.8970 | 1.49700 | 81.61 |
| 40 | −20.7441 | 11.2230 | | |
| 41 | 46.8086 | 4.2888 | 1.89286 | 20.36 |
| 42 | −202.9853 | 15.4506 | | |
| 43 | ∞ | 21.4592 | 1.51633 | 64.14 |
| 44 | ∞ | | | |

TABLE 18

EXAMPLE 5·SPECIFICATION (d LINE)

| | WIDE-ANGLE END | TELEPHOTO END |
|---|---|---|
| ZOOM RATIO | 1.00 | 1.05 |
| f' | −4.37 | −4.59 |
| Bf | 30.4 | 30.4 |
| Fno. | 2.04 | 2.04 |
| 2ω [°] | 132.8 | 130.8 |

TABLE 19

EXAMPLE 5·SURFACE SPACING

| | WIDE-ANGLE END | TELEPHOTO END |
|---|---|---|
| DD[27] | 5.8813 | 6.8588 |
| DD[31] | 18.3439 | 14.4762 |
| DD[33] | 7.1794 | 10.0696 |

TABLE 20

EXAMPLE 5·ASPHERIC COEFFICIENT

| SURFACE NUMBER | 1 | 2 | 20 |
|---|---|---|---|
| KA | −2.24634063E−01 | −1.49999988E+01 | −1.50000000E+01 |
| A3 | 6.85709265E−04 | 1.19273924E−03 | −4.61301506E−05 |
| A4 | 2.54853480E−05 | −2.19737019E−04 | 7.53398253E−05 |
| A5 | −1.85735125E−06 | 4.92008156E−05 | −1.08979900E−05 |
| A6 | 2.84103998E−08 | −7.64342853E−06 | 1.05774402E−06 |
| A7 | 8.69060228E−10 | 8.26045945E−07 | −2.32775781E−07 |
| A8 | −3.55491873E−11 | −6.35124602E−08 | 3.01748106E−08 |
| A9 | 4.01450102E−14 | 3.53902460E−09 | −1.87204902E−09 |
| A10 | 1.84788052E−14 | −1.44569684E−10 | 3.04421914E−11 |
| A11 | −2.78834958E−16 | 4.33383595E−12 | 1.54860174E−12 |
| A12 | −3.04121308E−18 | −9.42417065E−14 | 8.93213900E−14 |

TABLE 20-continued

EXAMPLE 5·ASPHERIC COEFFICIENT

| | | | |
|---|---:|---:|---:|
| A13 | 1.10981431E−19 | 1.44576885E−15 | −1.82129275E−14 |
| A14 | −3.73500576E−22 | −1.48249219E−17 | 8.33129132E−16 |
| A15 | −1.37016785E−23 | 9.11241614E−20 | 4.42140443E−17 |
| A16 | 1.21069733E−25 | −2.53763508E−22 | 5.53168985E−20 |

| SURFACE NUMBER | 21 |
|---|---:|
| KA | −5.21883568E+00 |
| A3 | −4.35025245E−05 |
| A4 | 9.92386784E−05 |
| A5 | −4.70894520E−06 |
| A6 | −6.87422727E−07 |
| A7 | 7.34533665E−08 |
| A8 | −4.52095139E−09 |
| A9 | 2.84057654E−10 |
| A10 | −1.10258920E−11 |
| A11 | 5.35540760E−14 |
| A12 | 1.16118120E−15 |
| A13 | 8.72998485E−16 |
| A14 | −5.15942374E−17 |
| A15 | 1.11070863E−18 |
| A16 | −9.16676445E−21 |

Figure 6:
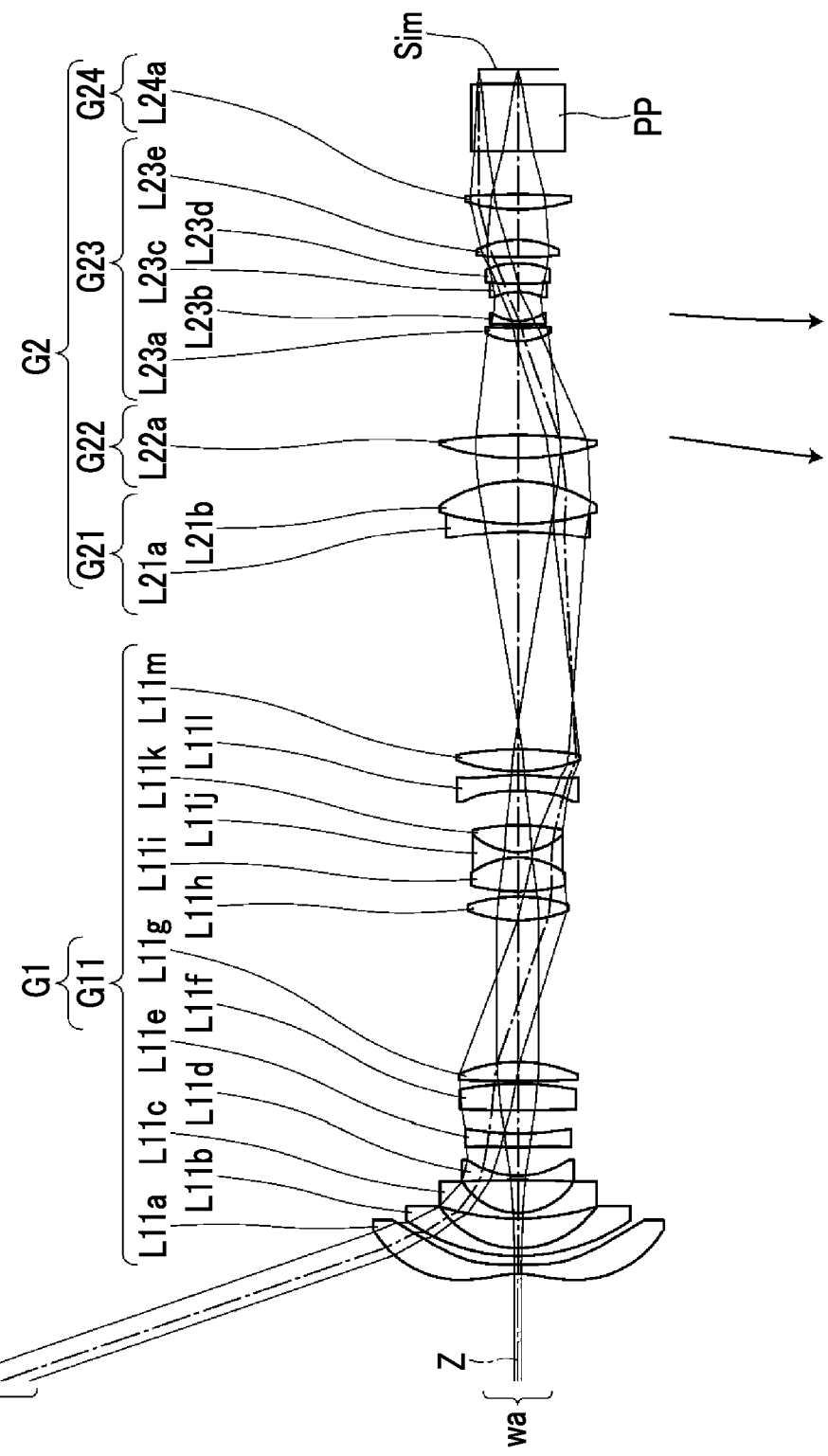
FIG. 6 is a cross-sectional view illustrating a configuration of a zoom lens of Example 6 of the present invention.

Next, a zoom lens of Example 6 will be described. FIG. 6 is a cross-sectional diagram illustrating a configuration of the zoom lens of Example 6.

The zoom lens of Example 6 has the same lens groups and has the same number of lenses as that of Example 5 except that the second-2 lens group G22 includes one lens as only a lens L22a, the second-3 lens group G23 includes five lenses as lenses L23a to L23e, and the second-4 lens group G24 includes one lens as only a lens L24a.

Figure 15:
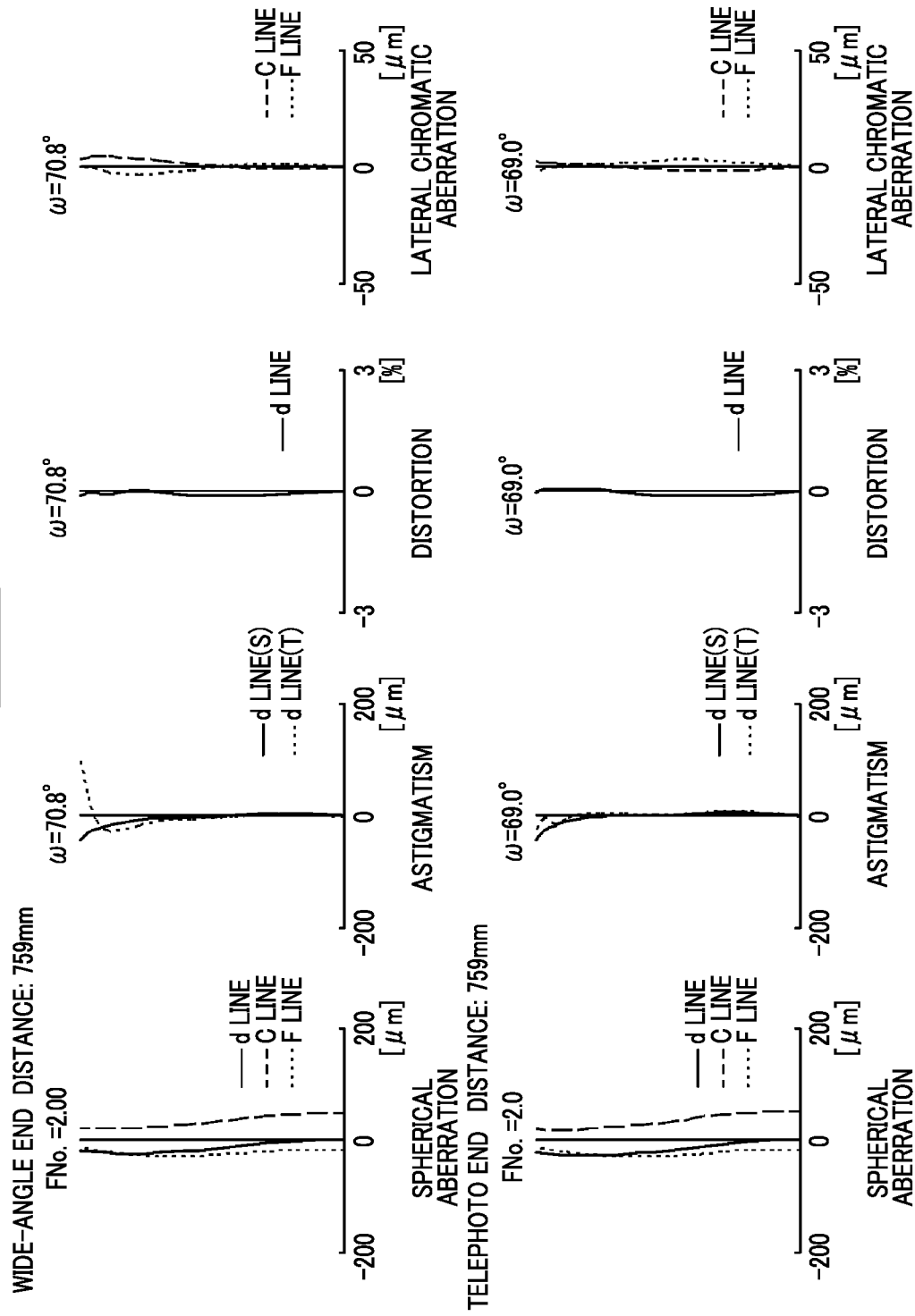
FIG. 15 is a diagram of aberrations of the zoom lens of Example 6 of the present invention.

Table 21 shows lens data of the zoom lens of Example 6, Table 22 shows data about specification, Table 23 shows surface spacings which are variable during zooming, Table 24 shows data about aspheric coefficients thereof, and FIG. 15 shows aberration diagrams.

TABLE 21

EXAMPLE 6·LENS DATA (n AND ν ARE BASED ON d LINE)

| SURFACE NUMBER | RADIUS OF CURVATURE | SURFACE SPACING | n | ν |
|---:|---:|---:|---:|---:|
| *1 | −18.3142 | 2.4899 | 1.49100 | 57.58 |
| *2 | −96.9137 | 2.0712 | | |
| 3 | 48.9275 | 1.9993 | 1.76450 | 49.10 |
| 4 | 23.9647 | 7.6151 | | |
| 5 | 65.9865 | 1.4477 | 1.83400 | 37.16 |
| 6 | 16.7451 | 8.4092 | | |
| 7 | −262.7052 | 1.1035 | 1.76200 | 40.10 |
| 8 | 22.5206 | 7.2640 | | |
| *9 | 64.5661 | 3.4803 | 1.49100 | 57.58 |
| *10 | 47.6316 | 5.7784 | | |
| 11 | 459.6927 | 6.7869 | 1.74077 | 27.76 |
| 12 | −76.4039 | 0.6899 | | |
| 13 | 393.0750 | 4.9037 | 1.72047 | 34.71 |
| 14 | −37.8135 | 36.2305 | | |
| 15 | 34.5572 | 6.0416 | 1.53775 | 74.70 |
| 16 | −40.9192 | 1.3530 | | |
| 17 | 48.3048 | 8.6595 | 1.55352 | 71.72 |
| 18 | −20.1461 | 1.4095 | 1.80518 | 25.42 |
| 19 | 16.9499 | 6.8429 | 1.49700 | 81.54 |
| 20 | −59.0487 | 8.7868 | | |
| *21 | −43.6810 | 4.1374 | 1.49100 | 57.58 |
| *22 | −31.9961 | 0.8987 | | |
| 23 | 44.8348 | 5.5682 | 1.84666 | 23.78 |
| 24 | −92.5400 | 55.8754 | | |
| 25 | −93.4627 | 2.0689 | 1.80518 | 25.42 |
| 26 | 67.9624 | 10.9710 | 1.58144 | 40.89 |
| 27 | −35.2286 | DD[27] | | |
| 28 | 61.9752 | 5.8752 | 1.79952 | 42.22 |
| 29 | −135.9888 | DD[29] | | |
| 30 | 17.4375 | 3.3738 | 1.83481 | 42.72 |
| 31 | 106.9410 | 0.8537 | | |
| 32 | 167.9264 | 0.9631 | 1.74000 | 28.30 |
| 33 | 12.2493 | 7.3901 | | |
| 34 | −15.0061 | 2.0324 | 1.84666 | 23.78 |
| 35 | 70.3074 | 5.3081 | 1.53775 | 74.70 |
| 36 | −21.7095 | 1.6271 | | |
| 37 | 178.8720 | 4.3492 | 1.53775 | 74.70 |
| 38 | −23.3635 | DD[38] | | |
| 39 | 46.9154 | 3.8362 | 1.89286 | 20.36 |
| 40 | −188.9199 | 11.0345 | | |
| 41 | ∞ | 17.2414 | 1.51633 | 64.14 |
| 42 | ∞ | | | |

TABLE 22

EXAMPLE 6·SPECIFICATION (d LINE)

| | WIDE-ANGLE END | TELEPHOTO END |
|---|---:|---:|
| ZOOM RATIO | 1.00 | 1.10 |
| f' | −3.47 | −3.81 |
| Bf | 26.1 | 26.1 |
| FNo. | 2.00 | 2.00 |
| 2ω [°] | 141.6 | 138.0 |

TABLE 23

EXAMPLE 6·SURFACE SPACING

| | WIDE-ANGLE END | TELEPHOTO END |
|---|---:|---:|
| DD[27] | 5.8860 | 0.3455 |
| DD[29] | 23.8400 | 27.3957 |
| DD[38] | 7.8289 | 9.8136 |

TABLE 24

EXAMPLE 6•ASPHERIC COEFFICIENT

| SURFACE NUMBER | 1 | 2 | 9 |
|---|---|---|---|
| KA | −1.26138649E+00 | −7.36472287E+00 | 1.00000000E+00 |
| A3 | 1.11962527E−03 | 1.90318892E−03 | 0.00000000E+00 |
| A4 | 6.18791319E−05 | −5.02875505E−04 | −1.45339138E−04 |
| A5 | −7.30412189E−06 | 1.52725566E−04 | 7.15371834E−06 |
| A6 | 1.84698956E−07 | −3.14409457E−05 | 1.31130093E−06 |
| A7 | 5.80998624E−09 | 4.49631464E−06 | −1.66483579E−07 |
| A8 | −4.06277240E−10 | −4.57413407E−07 | −2.87757981E−09 |
| A9 | 2.17418778E−12 | 3.37261441E−08 | 1.23131021E−09 |
| A10 | 3.83271931E−13 | −1.82331197E−09 | −2.73568039E−11 |
| A11 | −9.12972578E−15 | 7.23387826E−11 | −3.00539950E−12 |
| A12 | −1.12889738E−16 | −2.08168494E−12 | 1.20588131E−13 |
| A13 | 6.43688828E−18 | 4.22574161E−14 | |
| A14 | −3.17532421E−20 | −5.73391751E−16 | |
| A15 | −1.45786320E−21 | 4.66525403E−18 | |
| A16 | 1.73930116E−23 | −1.72069578E−20 | |

| SURFACE NUMBER | 10 | 21 | 22 |
|---|---|---|---|
| KA | 1.00000000E+00 | 1.00000000E+00 | 1.00000000E+00 |
| A3 | 0.00000000E+00 | 0.00000000E+00 | 0.00000000E+00 |
| A4 | −1.06529781E−04 | 1.07671836E−04 | 2.29177369E−04 |
| A5 | 9.56952425E−06 | −4.67490470E−06 | −1.50050356E−05 |
| A6 | 3.92878925E−07 | −2.05718485E−06 | −1.15775564E−06 |
| A7 | −1.18146965E−07 | 1.55179958E−07 | 1.86484842E−07 |
| A8 | 3.11710435E−09 | 1.78168332E−08 | 1.63859468E−09 |
| A9 | 5.38064659E−10 | −2.12373575E−09 | −1.13565294E−09 |
| A10 | −2.66546051E−11 | −8.74055999E−11 | 6.30970622E−12 |
| A11 | −7.75703642E−13 | 1.51347979E−11 | 4.23787555E−12 |
| A12 | 4.86194954E−14 | 1.54436892E−13 | −3.72125615E−14 |
| A13 | | −6.08582437E−14 | −9.30791016E−15 |
| A14 | | 3.19878530E−16 | 8.77854359E−17 |
| A15 | | 1.32079386E−15 | 1.08406322E−17 |
| A16 | | −1.01746976E−18 | −7.94769567E−20 |
| A17 | | −1.19789654E−19 | −5.11167026E−21 |

Figure 7:
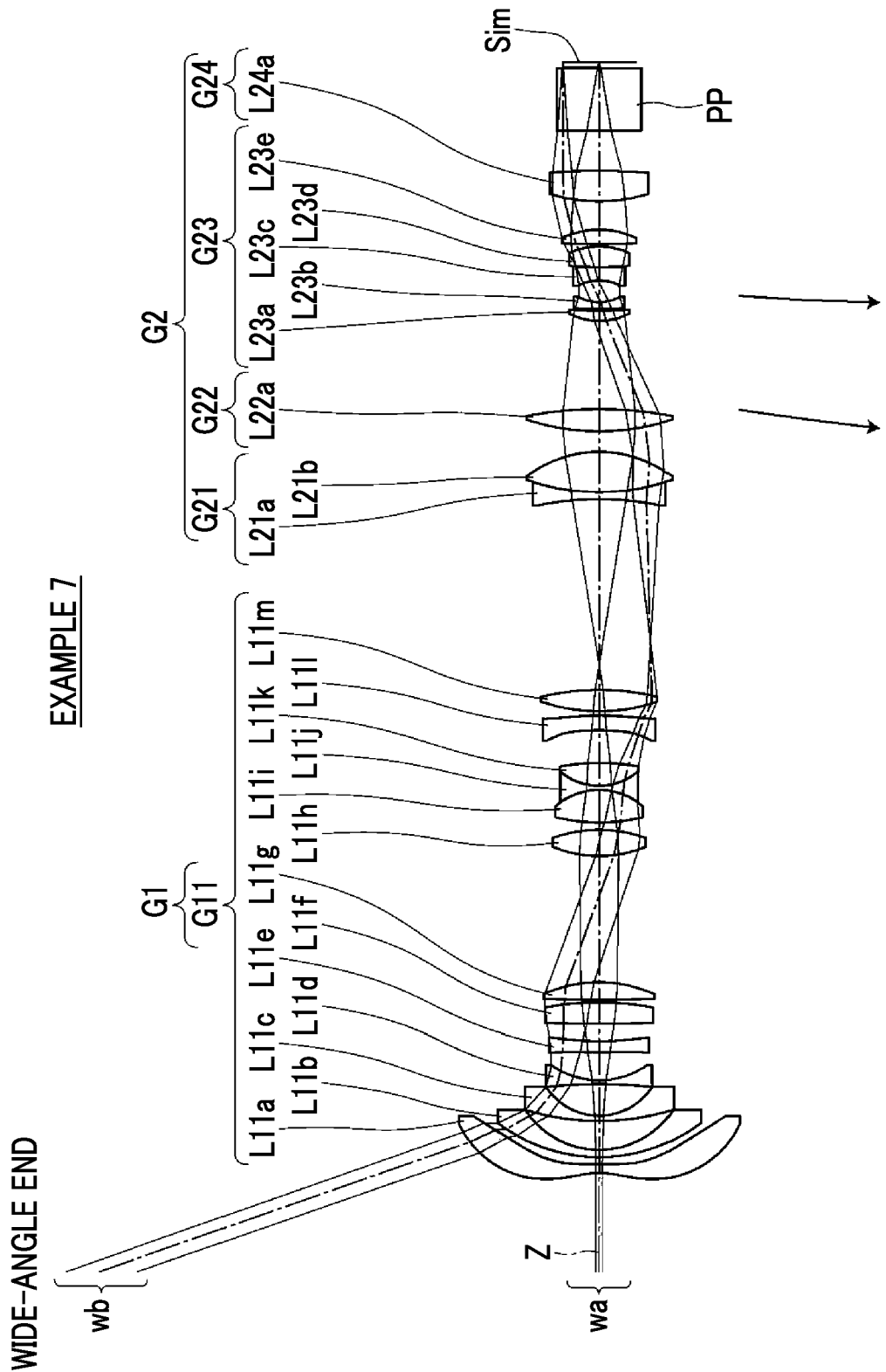
FIG. 7 is a cross-sectional view illustrating a configuration of a zoom lens of Example 7 of the present invention.
Figure 16:
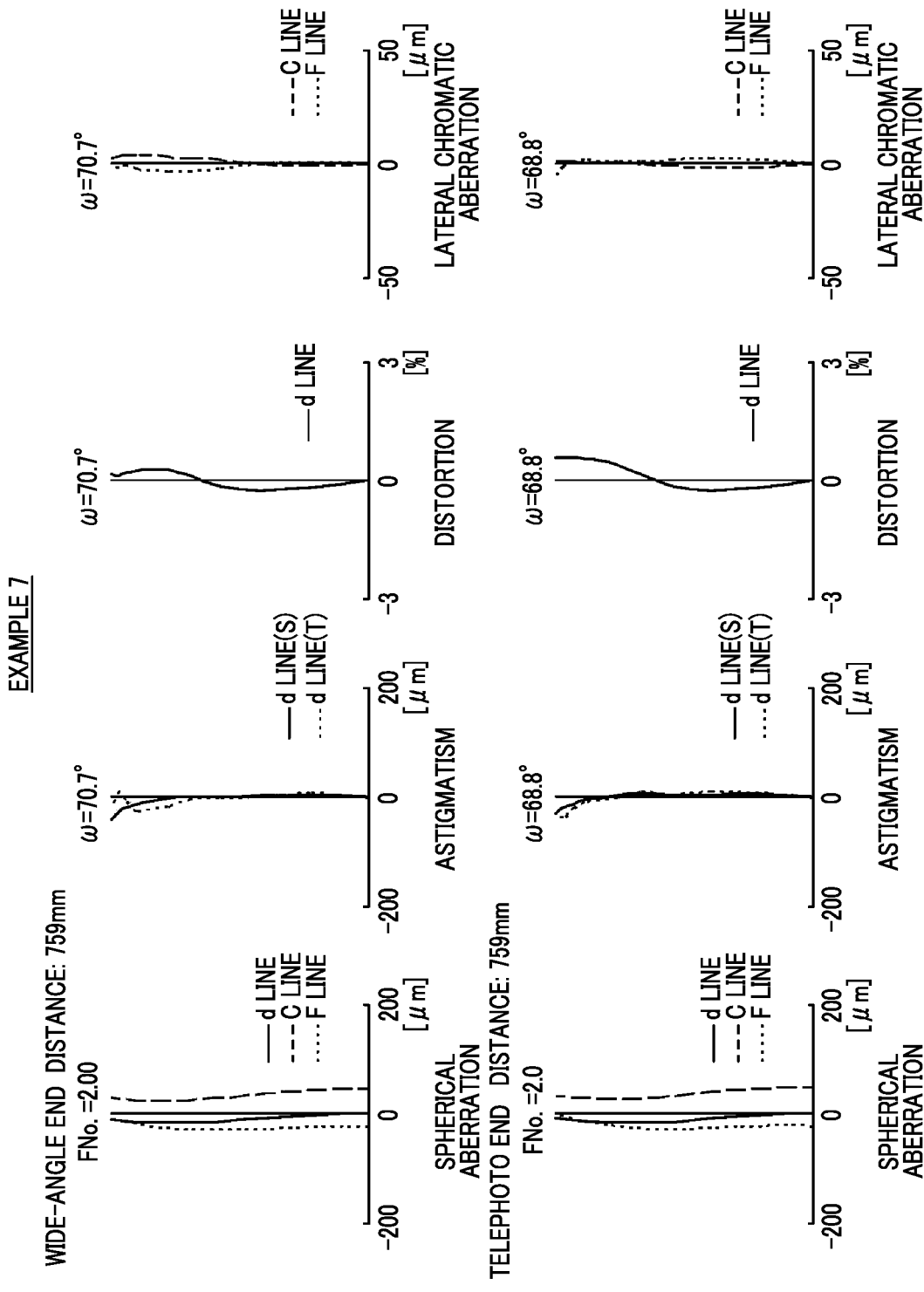
FIG. 16 is a diagram of aberrations of the zoom lens of Example 7 of the present invention.

Next, a zoom lens of Example 7 will be described. FIG. 7 is a cross-sectional diagram illustrating a configuration of the zoom lens of Example 7. The zoom lens of Example 7 has the same lens groups and has the same number of lenses as that of Example 6. Table 25 shows lens data of the zoom lens of Example 7, Table 26 shows data about specification, Table 27 shows surface spacings which are variable during zooming, Table 28 shows data about aspheric coefficients thereof, and FIG. 16 shows aberration diagrams.

TABLE 25

EXAMPLE 7•LENS DATA (n AND ν ARE BASED ON d LINE)

| SURFACE NUMBER | RADIUS OF CURVATURE | SURFACE SPACING | n | ν |
|---|---|---|---|---|
| *1 | −18.0722 | 2.4834 | 1.49100 | 57.58 |
| *2 | −85.9148 | 1.8776 | | |
| 3 | 45.8433 | 1.9998 | 1.76450 | 49.10 |
| 4 | 24.2503 | 7.9907 | | |
| 5 | 68.9915 | 1.4488 | 1.83400 | 37.16 |
| 6 | 17.3772 | 8.6513 | | |
| 7 | −149.4362 | 1.1028 | 1.76200 | 40.10 |
| 8 | 22.8779 | 7.6644 | | |
| *9 | 68.8034 | 3.0641 | 1.49100 | 57.58 |
| *10 | 49.1680 | 4.6844 | | |
| 11 | 485.7934 | 5.8468 | 1.72151 | 29.23 |
| 12 | −79.7558 | 0.6896 | | |
| 13 | 370.7280 | 4.8615 | 1.71736 | 29.52 |
| 14 | −37.0705 | 34.8054 | | |
| 15 | 33.8646 | 7.2326 | 1.53775 | 74.70 |
| 16 | −37.4184 | 2.0075 | | |
| 17 | 50.3838 | 8.9675 | 1.55352 | 71.72 |
| 18 | −18.3058 | 1.1350 | 1.80518 | 25.42 |
| 19 | 16.5342 | 6.3541 | 1.49700 | 81.54 |
| 20 | −55.4209 | 8.9268 | | |
| *21 | −61.1242 | 4.1373 | 1.49100 | 57.58 |
| *22 | −43.0984 | 1.1402 | | |
| 23 | 50.1121 | 5.8887 | 1.84666 | 23.78 |
| 24 | −68.1150 | 52.5693 | | |
| 25 | −84.4685 | 2.0690 | 1.80518 | 25.42 |
| 26 | 58.8366 | 11.1744 | 1.58144 | 40.89 |
| 27 | −32.9489 | DD[27] | | |
| 28 | 62.8069 | 6.1261 | 1.79952 | 42.22 |
| 29 | −109.0433 | DD[29] | | |
| 30 | 17.9117 | 2.7784 | 1.83481 | 42.72 |
| 31 | 72.4412 | 0.4807 | | |
| 32 | 97.6922 | 1.9376 | 1.74000 | 28.30 |
| 33 | 12.2621 | 5.9149 | | |
| 34 | −13.2927 | 3.7200 | 1.84666 | 23.78 |
| 35 | 106.5242 | 5.7310 | 1.53775 | 74.70 |
| 36 | −19.2178 | 0.5334 | | |
| 37 | 173.6807 | 4.0602 | 1.53775 | 74.70 |
| 38 | −23.8280 | DD[38] | | |
| 39 | 46.9760 | 8.3985 | 1.89286 | 20.36 |
| 40 | −162.9504 | 11.0345 | | |
| 41 | ∞ | 17.2414 | 1.51633 | 64.14 |
| 42 | ∞ | 1.6737 | | |

TABLE 26

EXAMPLE 7•SPECIFICATION (d LINE)

| | WIDE-ANGLE END | TELEPHOTO END |
|---|---|---|
| ZOOM RATIO | 1.00 | 1.10 |
| f' | −3.48 | −3.82 |
| Bf' | 24.1 | 24.1 |
| FNo. | 2.00 | 2.00 |
| 2ω [°] | 141.4 | 137.6 |

TABLE 27

EXAMPLE 7•SURFACE SPACING

| | WIDE-ANGLE END | TELEPHOTO END |
|---|---|---|
| DD[27] | 5.6585 | 0.3568 |
| DD[29] | 24.0937 | 27.4665 |
| DD[38] | 7.8548 | 9.7837 |

TABLE 28

EXAMPLE 7•ASPHERIC COEFFICIENT

| SURFACE NUMBER | 1 | 2 | 9 |
|---|---|---|---|
| KA | −1.27858444E+00 | −7.26297330E+00 | 1.00000000E+00 |
| A3 | 1.07991120E−03 | 1.85758980E−03 | 0.00000000E+00 |
| A4 | 5.87839048E−05 | −4.98283443E−04 | −1.56270239E−04 |
| A5 | −6.86176907E−06 | 1.52365113E−04 | 5.71294498E−06 |
| A6 | 1.77140306E−07 | −3.14079596E−05 | 1.66730719E−06 |
| A7 | 5.06113753E−09 | 4.49156954E−06 | −1.54083959E−07 |
| A8 | −3.77897330E−10 | −4.56730096E−07 | −6.75670768E−09 |
| A9 | 2.65063498E−12 | 3.36666064E−08 | 1.24976820E−09 |
| A10 | 3.43939349E−13 | −1.81985730E−09 | −1.26703950E−11 |
| A11 | −8.80848582E−15 | 7.21907908E−11 | −3.30908808E−12 |
| A12 | −9.34080074E−17 | −2.07698288E−12 | 1.10149898E−13 |
| A13 | 5.94901623E−18 | 4.21527344E−14 | |
| A14 | −3.18397095E−20 | −5.71873199E−16 | |

TABLE 28-continued

EXAMPLE 7·ASPHERIC COEFFICIENT

| | | |
|---|---|---|
| A15 | −1.31018651E−21 | 4.65225873E−18 |
| A16 | 1.57216995E−23 | −1.71556593E−20 |

| SURFACE NUMBER | 10 | 21 | 22 |
|---|---|---|---|
| KA | 1.00000000E+00 | 1.00000000E+00 | 1.00000000E+00 |
| A3 | 0.00000000E+00 | 0.00000000E+00 | 0.00000000E+00 |
| A4 | −1.17829234E−04 | 9.27895396E−05 | 2.02189620E−04 |
| A5 | 8.41607364E−06 | −1.05593897E−05 | −1.79956913E−05 |
| A6 | 7.54976557E−07 | −1.20967462E−06 | −7.41130472E−07 |
| A7 | −1.19504831E−07 | 1.86639122E−07 | 1.85965983E−07 |
| A8 | 9.69976346E−11 | 4.94935783E−09 | −1.46655004E−09 |
| A9 | 6.35079909E−10 | −1.93935264E−09 | −1.02110468E−09 |
| A10 | −1.88717468E−11 | 1.52447022E−11 | 1.83984062E−11 |
| A11 | −1.11908666E−12 | 1.13707715E−11 | 3.65934674E−12 |
| A12 | 4.78945640E−14 | −2.88507286E−13 | −6.14334350E−14 |
| A13 | | −3.86723478E−14 | −8.16957493E−15 |
| A14 | | 1.27920474E−16 | 1.09000799E−16 |
| A15 | | 7.41463017E−17 | 1.00481689E−17 |
| A16 | | −1.82492369E−18 | −8.34242710E−20 |
| A17 | | −6.30048483E−20 | −5.12968540E−21 |

Figure 8:
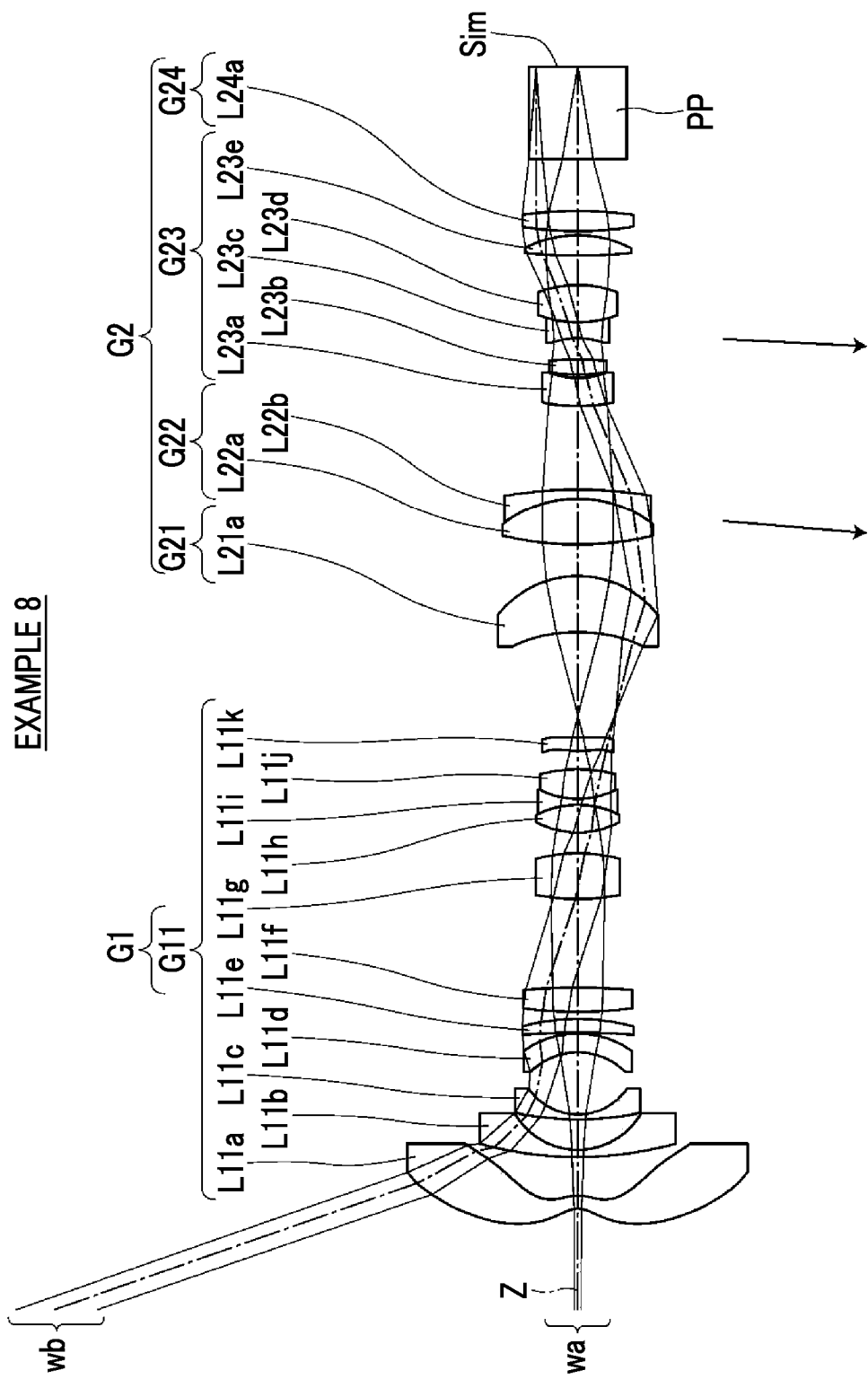
FIG. 8 is a cross-sectional view illustrating a configuration of a zoom lens of Example 8 of the present invention.

Next, a zoom lens of Example 8 will be described. FIG. 8 is a cross-sectional diagram illustrating a configuration of the zoom lens of Example 8.

The zoom lens of Example 8 has the same lens groups and has the same number of lenses as that of Example 7 except that the first-1 lens group G11 includes eleven lenses as lenses L11a to L11k, the second-1 lens group G21 includes one lens as only a lens L21a, and the second-2 lens group G22 includes two lenses as lenses L22a and L22b.

Figure 17:
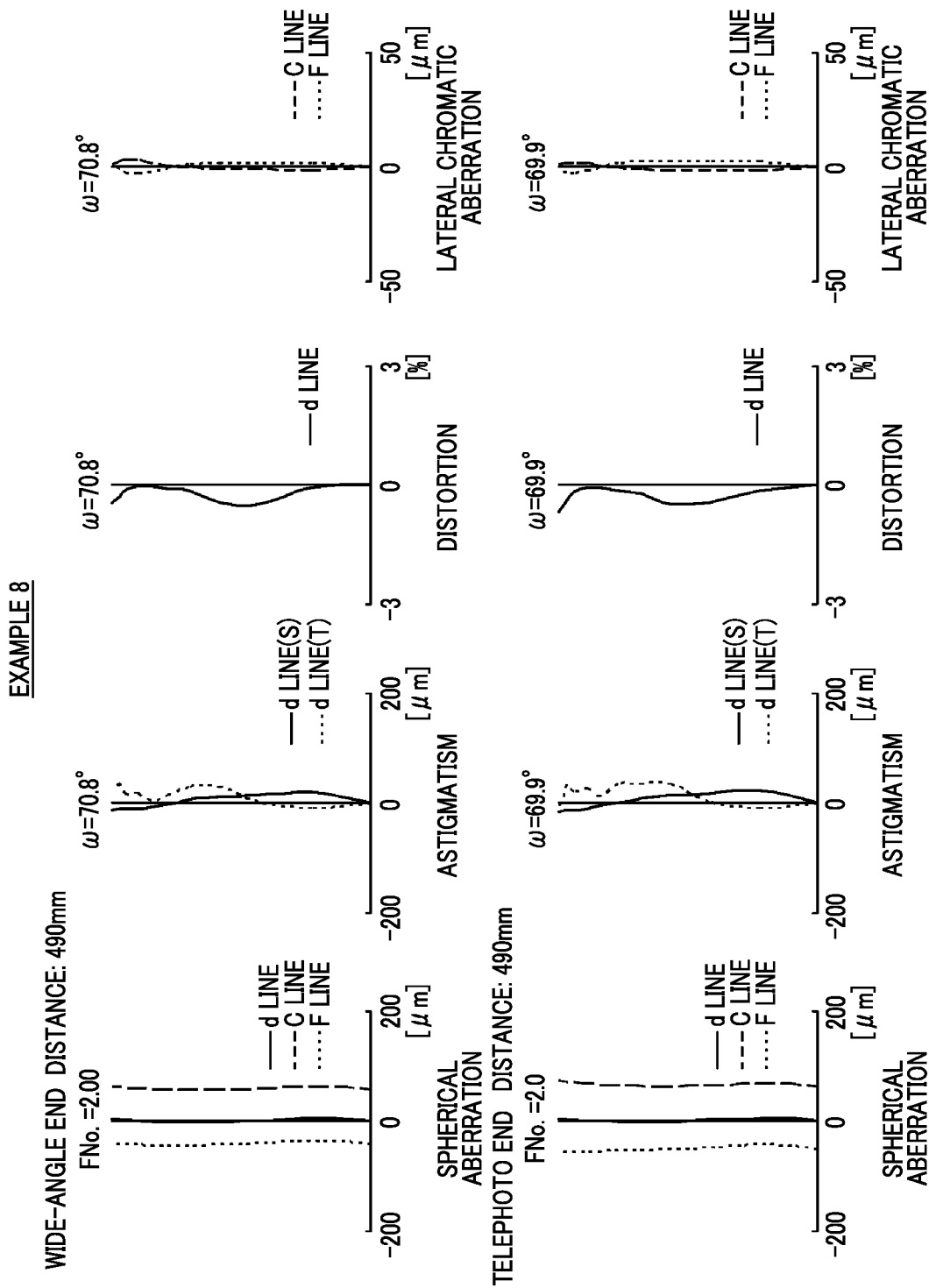
FIG. 17 is a diagram of aberrations of the zoom lens of Example 8 of the present invention.

Table 29 shows lens data of the zoom lens of Example 8, Table 30 shows data about specification, Table 31 shows surface spacings which are variable during zooming, Table 32 shows data about aspheric coefficients thereof, and FIG. 17 shows aberration diagrams.

TABLE 29

EXAMPLE 8·LENS DATA (n AND ν ARE BASED ON d LINE)

| SURFACE NUMBER | RADIUS OF CURVATURE | SURFACE SPACING | n | ν |
|---|---|---|---|---|
| *1 | −3.9261 | 3.1028 | 1.53158 | 55.08 |
| *2 | −6.6674 | 9.2268 | | |
| 3 | 87.9406 | 1.7243 | 1.69680 | 55.53 |
| 4 | 17.5353 | 7.2616 | | |
| *5 | 54.2864 | 1.2408 | 1.80400 | 46.58 |
| 6 | 14.2107 | 14.9180 | | |
| 7 | −15.9688 | 4.5125 | 1.59282 | 68.62 |
| 8 | −22.0377 | 0.1922 | | |
| 9 | −187.1105 | 3.3112 | 1.83481 | 42.72 |
| 10 | −50.1636 | 1.7243 | | |
| 11 | 109.2648 | 5.8546 | 1.90366 | 31.31 |
| 12 | −134.3402 | 21.2535 | | |
| 13 | 53.6247 | 10.9636 | 1.59282 | 68.62 |
| 14 | −38.6576 | 5.0139 | | |
| 15 | 21.6966 | 6.6322 | 1.59282 | 68.62 |
| 16 | −21.8692 | 1.4180 | 1.80518 | 25.46 |
| 17 | 19.6183 | 7.1138 | 1.49700 | 81.54 |
| 18 | −35.1083 | 4.4075 | | |
| *19 | 24.1707 | 3.1734 | 1.49100 | 57.58 |
| *20 | 39.6030 | 25.1690 | | |
| *21 | −41.1759 | 13.4971 | 1.83400 | 37.16 |
| 22 | −24.3035 | DD[22] | | |
| 23 | 75.9290 | 11.1603 | 1.83481 | 42.72 |
| 24 | −29.2766 | 2.2063 | 1.84666 | 23.78 |
| 25 | −104.0156 | DD[25] | | |
| 26 | 42.2806 | 6.7602 | 1.89286 | 20.36 |
| 27 | 18.8129 | 0.8641 | | |
| 28 | 47.3959 | 3.5848 | 1.90366 | 31.31 |

TABLE 29-continued

EXAMPLE 8·LENS DATA (n AND ν ARE BASED ON d LINE)

| SURFACE NUMBER | RADIUS OF CURVATURE | SURFACE SPACING | n | ν |
|---|---|---|---|---|
| 29 | −62.0620 | 5.0920 | | |
| 30 | −17.9944 | 3.8293 | 1.84666 | 23.78 |
| 31 | 27.2161 | 8.9730 | 1.59282 | 68.62 |
| 32 | −26.3998 | 7.0962 | | |
| 33 | 148.9135 | 4.8282 | 1.49700 | 81.54 |
| 34 | −28.1958 | DD[34] | | |
| 35 | 86.4463 | 4.8269 | 1.89286 | 20.36 |
| 36 | −100.4970 | 12.4105 | | |
| 37 | ∞ | 22.2759 | 1.51633 | 64.14 |
| 38 | ∞ | 0.0012 | | |

TABLE 30

EXAMPLE 8·SPECIFICATION (d LINE)

| | WIDE-ANGLE END | TELEPHOTO END |
|---|---|---|
| ZOOM RATIO | 1.00 | 1.05 |
| f | −3.44 | −3.61 |
| Bf | 27.1 | 27.1 |
| FNo. | 2.00 | 2.00 |
| 2ω [°] | 141.6 | 139.8 |

TABLE 31

EXAMPLE 8·SURFACE SPACING

| | WIDE-ANGLE END | TELEPHOTO END |
|---|---|---|
| DD[22] | 7.5586 | 4.2329 |
| DD[25] | 20.0872 | 21.4725 |
| DD[34] | 1.0117 | 2.9521 |

TABLE 32

EXAMPLE 8·ASPHERIC COEFFICIENT

| SURFACE NUMBER | 1 | 2 | 5 |
|---|---|---|---|
| KA | −1.70962023E+00 | −4.04257735E+00 | 1.00000000E+00 |
| A3 | 3.80211648E−03 | 3.19768514E−03 | |
| A4 | −6.92039587E−05 | −2.66755048E−04 | −3.04488171E−05 |
| A5 | −1.88771936E−05 | 2.22418949E−04 | |
| A6 | 1.21599132E−06 | −5.66506193E−05 | 1.14304085E−07 |
| A7 | 9.56272647E−09 | 8.11182249E−06 | |
| A8 | −3.07000112E−09 | −8.25284042E−07 | −5.78079430E−11 |
| A9 | 5.33195429E−11 | 6.53285452E−08 | |
| A10 | 3.63737040E−12 | −3.99954510E−09 | −2.99167739E−15 |
| A11 | −1.24529182E−13 | 1.77990175E−10 | |
| A12 | −1.95510693E−15 | −5.34542815E−12 | |
| A13 | 1.24227459E−16 | 1.02800139E−13 | |
| A14 | 5.12287781E−20 | −1.47420780E−15 | |
| A15 | −6.58005136E−20 | 2.75462860E−17 | |
| A16 | 4.62300695E−22 | −3.58553440E−19 | |
| A17 | 1.80683673E−23 | −6.31526747E−21 | |
| A18 | −2.07603824E−25 | 1.81720619E−22 | |
| A19 | −2.02510045E−27 | 1.30374556E−24 | |
| A20 | 2.94286529E−29 | −4.32746318E−26 | |

| SURFACE NUMBER | 19 | 20 | 21 |
|---|---|---|---|
| KA | −1.14529633E+02 | 3.84172658E+00 | 1.00000000E+00 |
| A3 | −4.82596925E−04 | −7.38345686E−04 | |
| A4 | 1.54767450E−03 | 2.32327057E−04 | −1.70653659E−06 |
| A5 | −5.01726229E−04 | −1.20117645E−04 | |
| A6 | 2.36163675E−05 | −2.09926495E−05 | −2.16635529E−08 |

TABLE 32-continued

EXAMPLE 8•ASPHERIC COEFFICIENT

| | | | |
|---|---|---|---|
| A7 | 9.89247091E−06 | 8.70489768E−06 | |
| A8 | −1.25947510E−06 | 8.94481587E−08 | 7.53616464E−12 |
| A9 | −7.87089835E−08 | −2.24826651E−07 | |
| A10 | 1.69373200E−08 | 6.71737724E−09 | 2.41704600E−15 |
| A11 | 3.18090987E−10 | 3.27166113E−09 | |
| A12 | −1.17578405E−10 | −1.67149051E−10 | |
| A13 | −5.73158638E−13 | −2.73500532E−11 | |
| A14 | 4.71613606E−13 | 1.76998041E−12 | |
| A15 | −1.48204447E−16 | 1.30443211E−13 | |
| A16 | −1.10400617E−15 | −9.76299652E−15 | |
| A17 | 2.09208316E−18 | −3.29615505E−16 | |
| A18 | 1.40474536E−18 | 2.75350867E−17 | |
| A19 | −2.18909900E−21 | 3.41441878E−19 | |
| A20 | −7.52896964E−22 | −3.14758574E−20 | |

Figure 9:
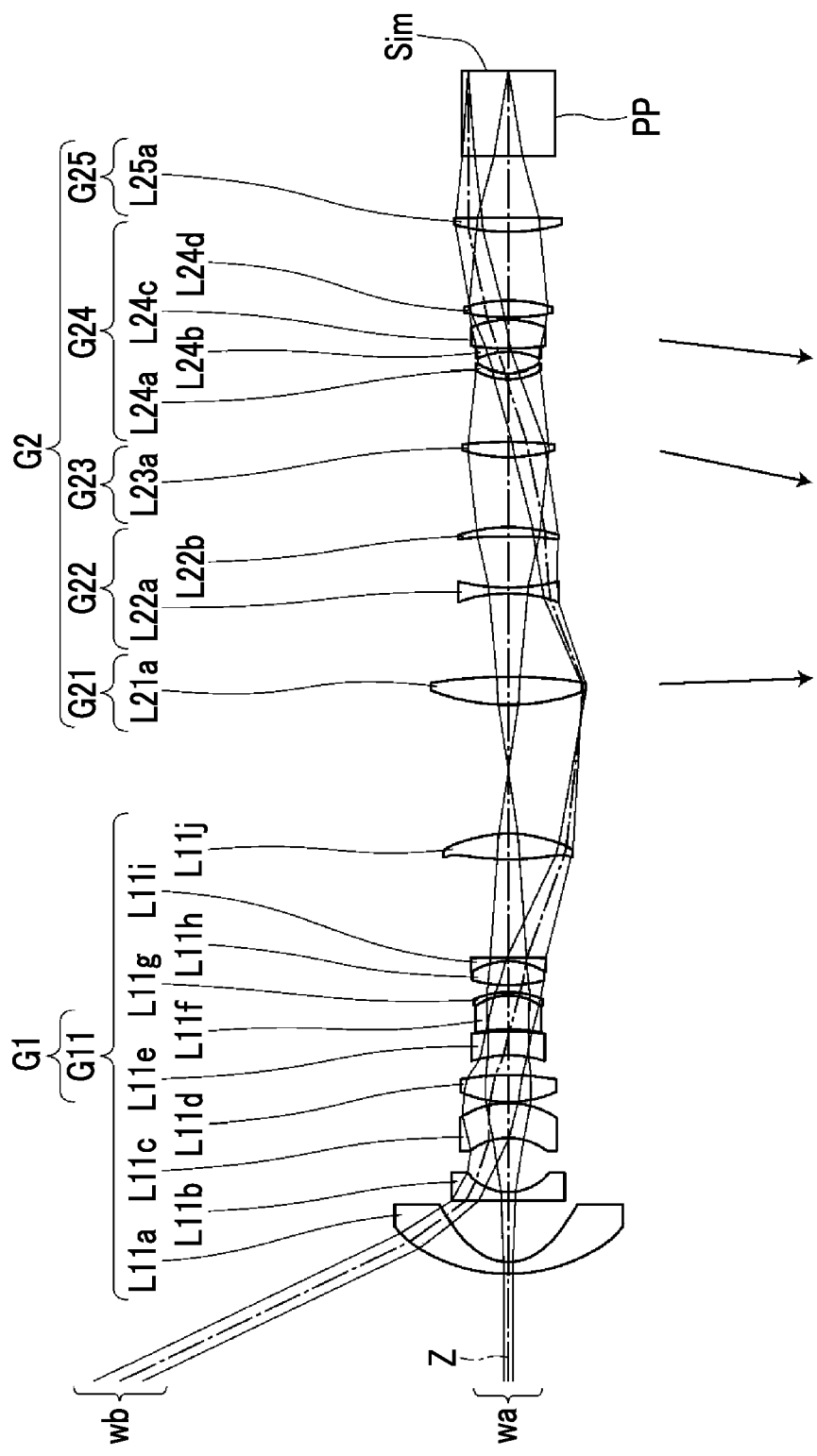
FIG. 9 is a cross-sectional view illustrating a configuration of a zoom lens of Example 9 of the present invention.

Next, a zoom lens of Example 9 will be described. FIG. 9 is a cross-sectional diagram illustrating a configuration of the zoom lens of Example 9.

The zoom lens of Example 9 includes a first optical system G1 on the magnification side, and a second optical system G2 on the reduction side, in a state where the intermediate image is formed therebetween. The first optical system G1 includes only a first-1 lens group G11. The second optical system G2 includes a second-1 lens group G21, a second-2 lens group G22, a second-3 lens group G23, a second-4 lens group G24, and a second-5 lens group G25.

The first-1 lens group G11, the second-2 lens group G22, and the second-5 lens group G25 remain stationary with respect to the reduction side imaging plane (image display surface Sim) during zooming. The second-1 lens group G21, the second-3 lens group G23, and the second-4 lens group G24 are configured to move by changing spacings of the groups adjacent to each other in the direction of the optical axis during zooming.

The first-1 lens group G11 includes ten lenses as lenses L11a to L11j. The second-1 lens group G21 includes one lens as only a lens L21a. The second-2 lens group G22 includes two lenses as lenses L22a and L22b. The second-3 lens group G23 includes one lens as only a lens L23a. The second-4 lens group G24 includes four lenses as lenses L24a to L24d. The second-5 lens group G25 includes one lens as only a lens L25a.

Figure 18:
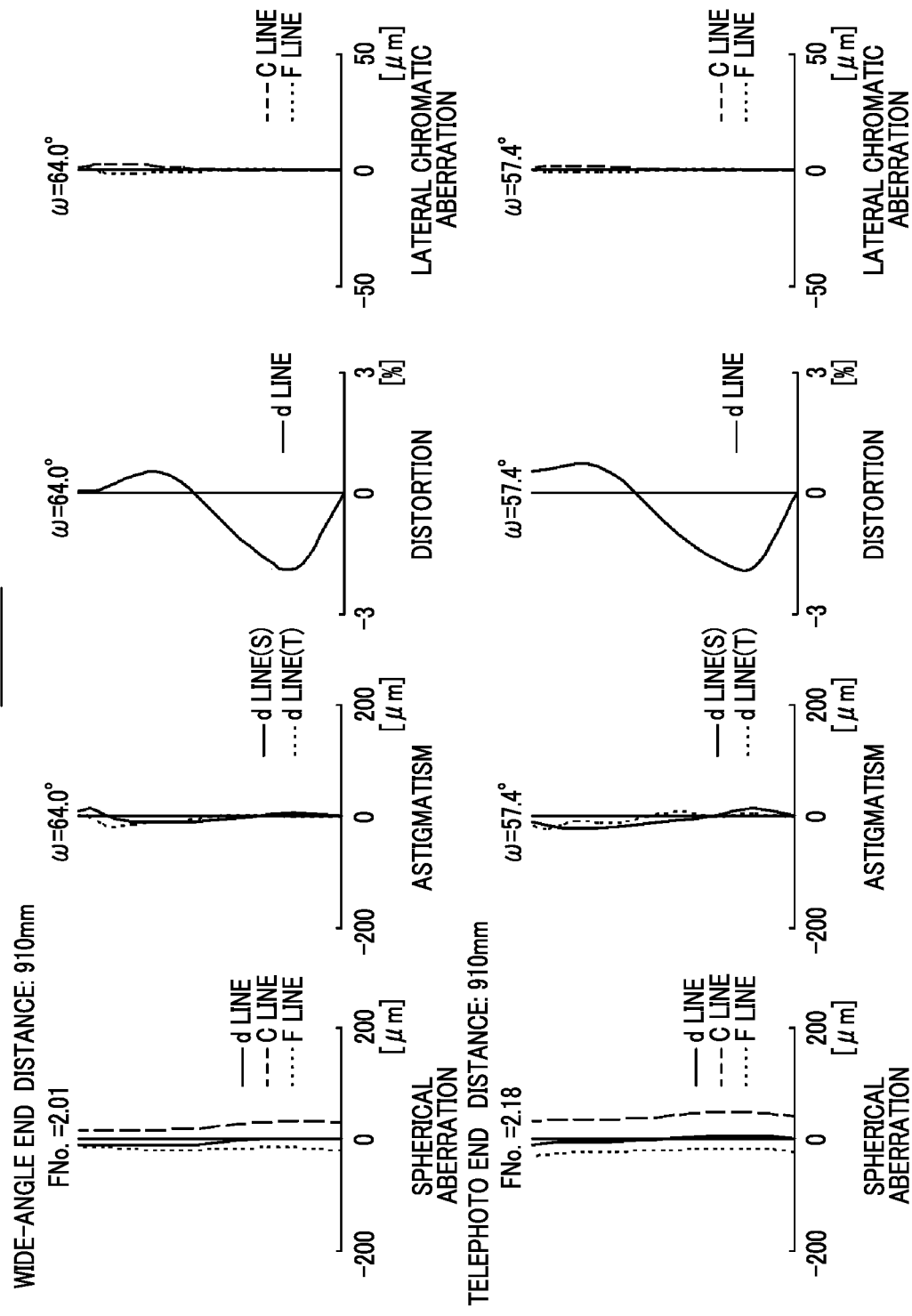
FIG. 18 is a diagram of aberrations of the zoom lens of Example 9 of the present invention.

Table 33 shows lens data of the zoom lens of Example 9, Table 34 shows data about specification, Table 35 shows surface spacings which are variable during zooming, Table 36 shows data about aspheric coefficients thereof, and FIG. 18 shows aberration diagrams.

TABLE 33

EXAMPLE 9•LENS DATA (n AND ν ARE BASED ON d LINE)

| SURFACE NUMBER | RADIUS OF CURVATURE | SURFACE SPACING | n | ν |
|---|---|---|---|---|
| *1 | 43.7820 | 3.0043 | 1.58313 | 59.46 |
| *2 | 12.1690 | 15.4826 | | |
| 3 | −3621.7257 | 2.1452 | 1.74400 | 44.79 |
| 4 | 13.0064 | 13.6497 | | |
| 5 | −15.6801 | 8.5833 | 1.85150 | 40.78 |
| 6 | −21.2082 | 0.2575 | | |
| 7 | 28.9424 | 6.7889 | 1.85150 | 40.78 |
| 8 | −69.8015 | 4.9862 | | |
| 9 | −28.7629 | 5.9785 | 1.63980 | 34.47 |
| 10 | −86.7152 | 0.5360 | | |
| 11 | −45.4911 | 8.5842 | 1.49700 | 81.61 |
| 12 | −13.4355 | 0.8429 | 1.56732 | 42.82 |
| 13 | −21.2070 | 1.7605 | | |

TABLE 33-continued

EXAMPLE 9•LENS DATA (n AND ν ARE BASED ON d LINE)

| SURFACE NUMBER | RADIUS OF CURVATURE | SURFACE SPACING | n | ν |
|---|---|---|---|---|
| 14 | 34.7600 | 5.9948 | 1.49700 | 81.61 |
| 15 | −16.8665 | 0.9236 | 1.84666 | 23.78 |
| 16 | −569.5497 | 24.7355 | | |
| *17 | 55.8667 | 6.5598 | 1.58313 | 59.46 |
| *18 | −26.5760 | DD[18] | | |
| 19 | 52.8206 | 7.1444 | 1.84666 | 23.78 |
| 20 | −115.7855 | DD[20] | | |
| 21 | −36.5731 | 1.4808 | 1.51742 | 52.43 |
| 22 | 50.3770 | 12.9414 | | |
| 23 | −97.3210 | 2.4765 | 1.84666 | 23.78 |
| 24 | −40.8973 | DD[24] | | |
| 25 | 39.3700 | 3.8191 | 1.59522 | 67.73 |
| 26 | −103.2555 | DD[26] | | |
| 27 | 16.0221 | 1.4848 | 1.59270 | 35.31 |
| 28 | 13.7146 | 5.2389 | | |
| 29 | −18.3762 | 0.8064 | 1.84666 | 23.78 |
| 30 | 66.3341 | 7.2751 | 1.49700 | 81.61 |
| 31 | −22.7622 | 0.6034 | | |
| 32 | 54.4943 | 4.2959 | 1.49700 | 81.61 |
| 33 | −34.9174 | DD[33] | | |
| 34 | 50.8073 | 3.6582 | 1.89286 | 20.36 |
| 35 | −386.5853 | 15.4506 | | |
| 36 | ∞ | 21.4592 | 1.51633 | 64.14 |
| 37 | ∞ | | | |

TABLE 34

EXAMPLE 9•SPECIFICATION (d LINE)

| | WIDE-ANGLE END | TELEPHOTO END |
|---|---|---|
| ZOOM RATIO | 1.00 | 1.30 |
| f' | −4.87 | −6.33 |
| Bf' | 29.59 | 29.57 |
| FNo. | 2.01 | 2.18 |
| 2ω [°] | 128.0 | 114.8 |

TABLE 35

EXAMPLE 9•SURFACE SPACING

| | WIDE-ANGLE END | TELEPHOTO END |
|---|---|---|
| DD[18] | 32.4035 | 35.7393 |
| DD[20] | 20.9424 | 17.6066 |
| DD[24] | 17.6979 | 5.1423 |
| DD[26] | 15.7552 | 17.6702 |
| DD[33] | 17.2741 | 27.9147 |

TABLE 36

EXAMPLE 9•ASPHERIC COEFFICIENT

| SURFACE NUMBER | 1 | 2 | 17 |
|---|---|---|---|
| KA | −4.24970836E−02 | −4.64477455E−03 | −1.49999933E+01 |
| A3 | −1.30822114E−05 | 6.76436187E−04 | −2.89594937E−04 |
| A4 | 1.93715848E−05 | −1.93860437E−04 | 8.46658310E−05 |
| A5 | −1.42648520E−06 | 5.06960614E−05 | −8.85316522E−06 |
| A6 | 2.80668296E−08 | −7.66636566E−06 | 1.09026833E−06 |
| A7 | 8.44435005E−10 | 8.22019334E−07 | −2.33722201E−07 |
| A8 | −3.52786084E−11 | −6.37914746E−08 | 3.00160084E−08 |
| A9 | 8.48069111E−14 | 3.55178767E−09 | −1.87494972E−09 |
| A10 | 1.95519057E−14 | −1.43780033E−10 | 3.04734520E−11 |
| A11 | −2.93295577E−16 | 4.35656051E−12 | 1.53300627E−12 |
| A12 | −4.98540342E−18 | −9.31634067E−14 | 8.95351759E−14 |
| A13 | 1.38633039E−19 | 1.32335727E−15 | −1.82354343E−14 |

TABLE 36-continued

EXAMPLE 9·ASPHERIC COEFFICIENT

| A14 | −6.41898871E−21 | −2.03861563E−17 | 8.30941538E−16 |
| A15 | 5.07613214E−23 | −3.66965968E−19 | −1.46593314E−17 |
| A16 | 5.98427750E−24 | 2.00854295E−20 | 7.39127330E−20 |

| SURFACE NUMBER | 18 |
| --- | --- |
| KA | −1.93103155E+00 |
| A3 | −4.29126320E−04 |
| A4 | 1.12947942E−04 |
| A5 | −3.44746862E−06 |
| A6 | −6.59037208E−07 |
| A7 | 7.37017992E−08 |
| A8 | −4.56157942E−09 |
| A9 | 2.77584717E−10 |
| A10 | −1.13036456E−11 |
| A11 | 2.20630456E−14 |
| A12 | 7.55267952E−16 |
| A13 | 8.88117133E−16 |
| A14 | −5.00518447E−17 |
| A15 | 1.31646330E−18 |
| A16 | −1.84516502E−20 |

Table 37 shows values corresponding to the conditional expressions (1) to (5) of the zoom lenses of Examples 1 to 9. It should be noted that, in the above-mentioned examples, the d line is set as the reference wavelength, and the values shown in the following Table 37 are values at the reference wavelength.

TABLE 37

| EXPRESSION NUMBER | CONDITIONAL EXPRESSION | EXAMPLE 1 | EXAMPLE 2 | EXAMPLE 3 | EXAMPLE 4 | EXAMPLE 5 |
| --- | --- | --- | --- | --- | --- | --- |
| (1) | \|fw\|/f21 | 0.099 | 0.088 | 0.095 | 0.097 | 0.014 |
| (2) | b/a | 6.00 | 5.23 | 6.24 | 6.24 | 6.45 |
| (3) | \|fw\|/f23 | 0.061 | 0.089 | 0.059 | 0.058 | 0.085 |
| (4) | \|fw\|/f2e | 0.064 | 0.108 | 0.071 | 0.072 | 0.149 |
| (5) | f1/\|fw\| | 1.37 | 1.70 | 1.33 | 1.35 | 1.89 |

| EXPRESSION NUMBER | CONDITIONAL EXPRESSION | EXAMPLE 6 | EXAMPLE 7 | EXAMPLE 8 | EXAMPLE 9 |
| --- | --- | --- | --- | --- | --- |
| (1) | \|fw\|/f21 | 0.021 | 0.021 | 0.066 | 0.111 |
| (2) | b/a | 9.35 | 9.49 | 9.75 | 5.23 |
| (3) | \|fw\|/f23 | 0.007 | 0.004 | 0.045 | 0.101 |
| (4) | \|fw\|/f2e | 0.084 | 0.082 | 0.065 | 0.096 |
| (5) | f1/\|fw\| | 1.57 | 1.53 | 1.00 | 1.67 |

As can be seen from the above-mentioned data, all the zoom lenses of Examples 1 to 9 satisfy the conditional expressions (1) to (5), and are zoom lenses each of which has a total angle of view of 120° or more at the wide-angle end and has a small size with a wide angle.

Figure 19:
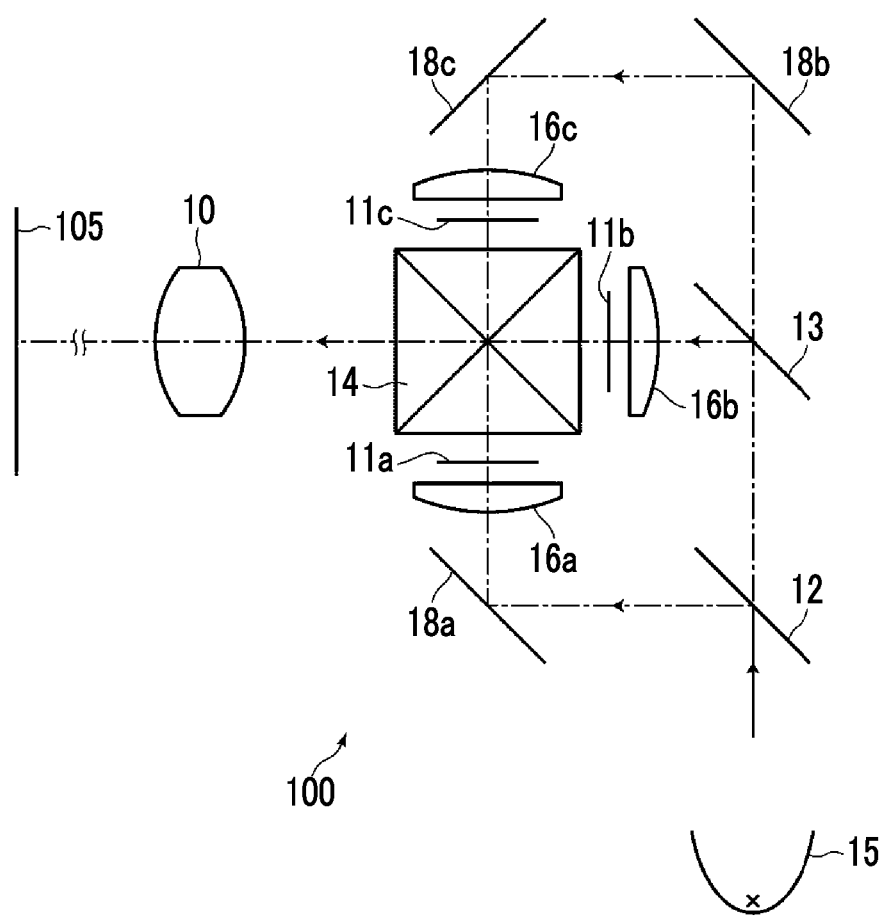
FIG. 19 is a schematic configuration diagram of a projection display device according to an embodiment of the present invention.

Next, a projection display device according to an embodiment of the present invention will be described. FIG. 19 is a schematic configuration diagram of the projection display device according to the embodiment of the present invention. The projection display device 100 shown in FIG. 19 has a zoom lens 10 according to the embodiment of the present invention, a light source 15, transmissive display elements 11a to 11c as light valves corresponding to respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 19, the zoom lens 10 is schematically illustrated. Further, an integrator is disposed between the light source 15 and the dichroic mirror 12, but illustration thereof is omitted in FIG. 19.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the zoom lens 10. The zoom lens 10 projects an optical image, which is formed by the light modulated through the transmissive display elements 11a to 11c, onto a screen 105.

Figure 20:
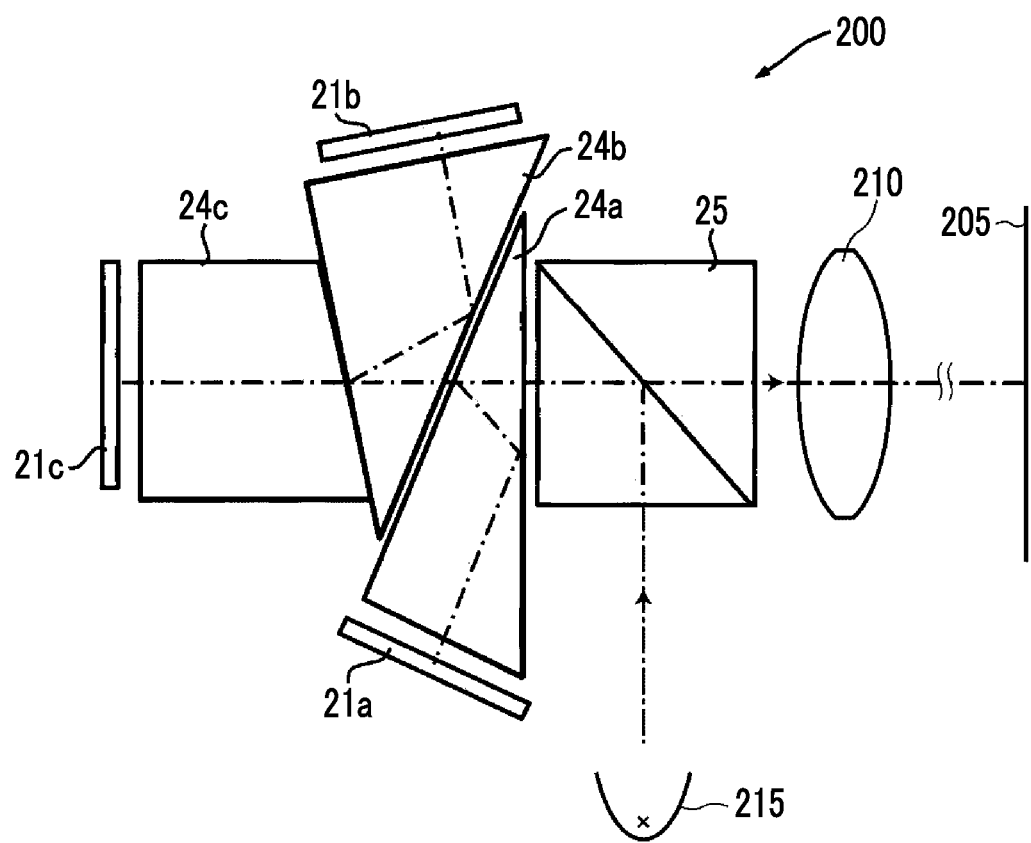
FIG. 20 is a schematic configuration diagram of a projection display device according to another embodiment of the present invention.

FIG. 20 is a schematic configuration diagram of a projection display device according to another embodiment of the present invention. The projection display device 200 shown in FIG. 20 has a zoom lens 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 20, the zoom lens 210 is schematically illustrated. Further, an integrator is disposed between the light source 215 and the polarization separating prism 25, but illustration thereof is omitted in FIG. 20.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the zoom lens 210. The zoom lens 210 projects an optical image, which is formed by the light modulated through the DMD elements 21a to 21c, onto a screen 205.

Figure 21:
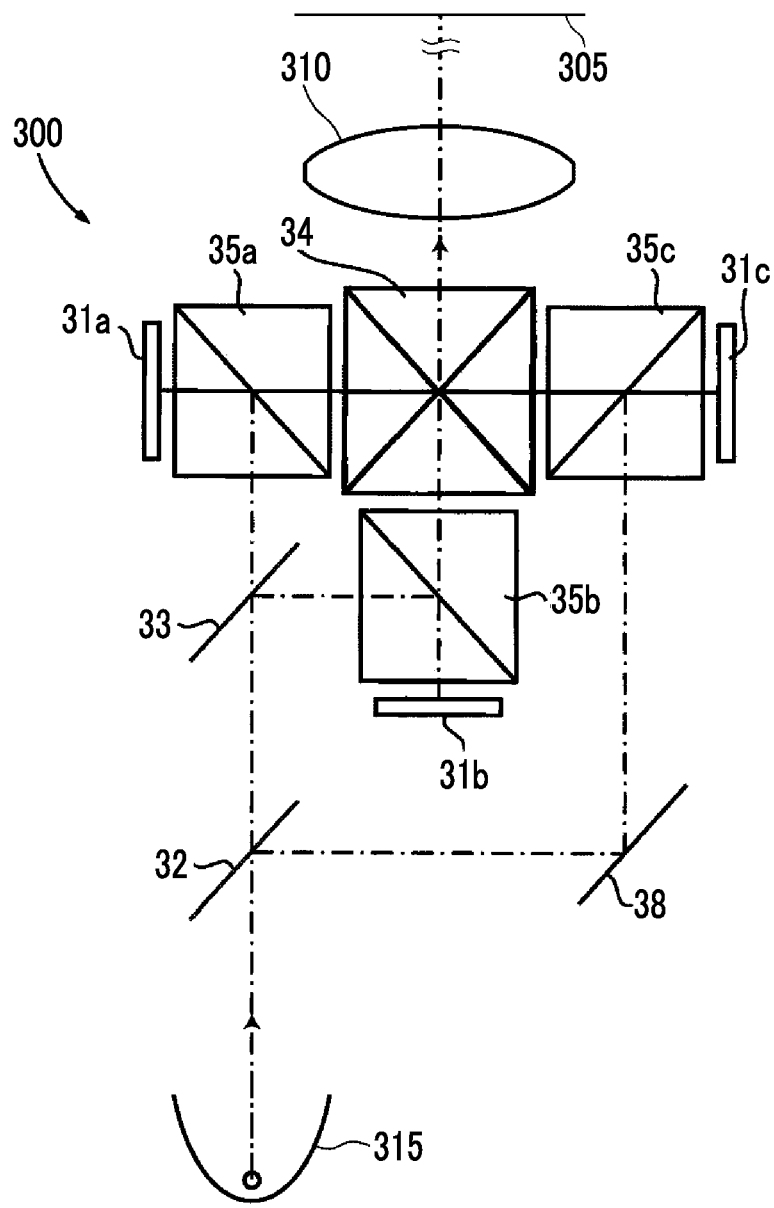
FIG. 21 is a schematic configuration diagram of a projection display device according to still another embodiment of the present invention.

FIG. 21 is a schematic configuration diagram of a projection display device according to still another embodiment of the present invention. The projection display device 300 shown in FIG. 21 has a zoom lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 21, the zoom lens 310 is schematically illustrated. Further, an integrator is disposed between the light source 315 and the dichroic mirror 32, but illustration thereof is omitted in FIG. 21.

White light originating from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the zoom lens 310. The zoom lens 310 projects an optical image, which is formed by the light modulated through the reflective display elements 31a to 31c, onto a screen 305.

Figure 22:
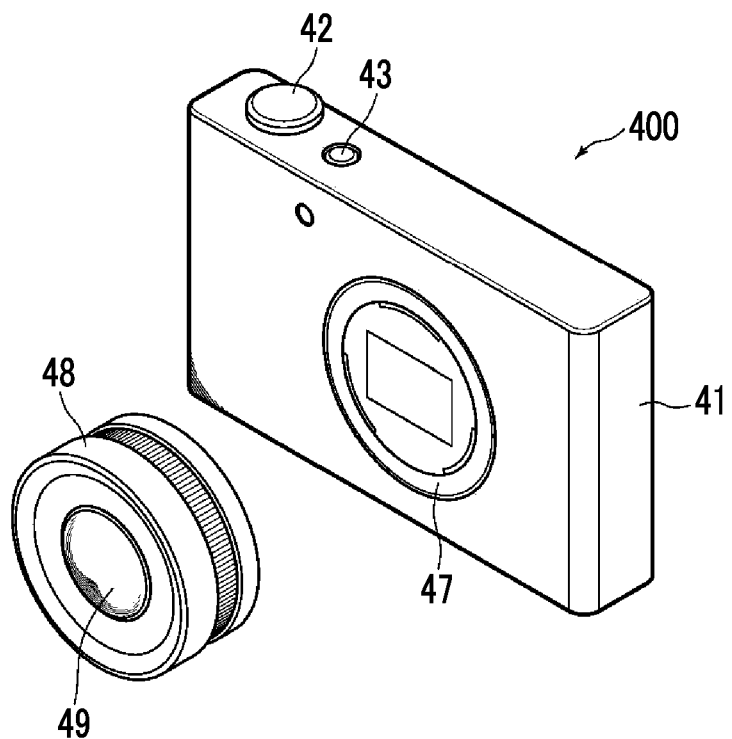
FIG. 22 is a perspective view of the front side of an imaging apparatus according to an embodiment of the present invention.
Figure 23:
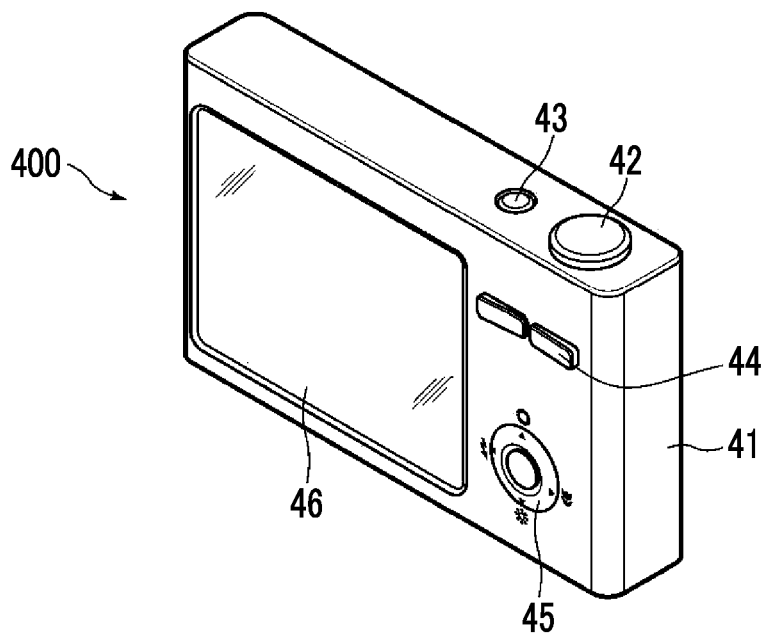
FIG. 23 is a perspective view of the rear side of the imaging apparatus shown in FIG. 22.

FIGS. 22 and 23 are external views of a camera 400 which is the imaging apparatus according to the embodiment of the present invention. FIG. 22 is a perspective view of the camera 400 viewed from the front side, and FIG. 23 is a perspective view of the camera 400 viewed from the rear side. The camera 400 is a single-lens digital camera on which an interchangeable lens 48 is detachably mounted and which has no reflex finder. The interchangeable lens 48 is configured such that a zoom lens 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 captures a still image or a moving image by pressing the shutter button 42, and records image data, which is obtained through imaging, in the recording medium.

The present invention has been hitherto described through embodiments and examples, but the zoom lens of the present invention is not limited to the above-mentioned embodiments and examples, and may be modified into various forms. For example, the radius of curvature, the surface spacing, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

EXPLANATION OF REFERENCES 10, 210, 310: zoom lens
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: zoom lens
100, 200, 300: projection display device
105, 205, 305: screen
400: camera
G1: first optical system
G11: first-1 lens group
G2: second optical system
G21: second-1 lens group
G22: second-2 lens group
G23: second-3 lens group
G24: second-4 lens group
G25: second-5 lens group
L11a to L25a: lens
PP: optical member
Sim: image display surface
wa: on-axis rays
wb: rays with maximum angle of view
Z: optical axis

What is claimed is:

1. A zoom lens that forms an intermediate image at a position conjugate to a reduction side imaging plane on a reduction side and forms the intermediate image again on a magnification side imaging plane on a magnification side, the zoom lens comprising:

a first optical system on the magnification side; and
a second optical system on the reduction side,
wherein the intermediate image is formed between the magnification side and the reduction side,
wherein the second optical system includes two or more movable lens groups, which move by changing spacings between the lens groups that are adjacent to each other in a direction of an optical axis during zooming, and two stationary lens groups which remain stationary with respect to the reduction side imaging plane during zooming,
wherein one stationary lens group of the two stationary lens groups is disposed to be closest to the reduction side, and has a positive refractive power, and
wherein a lens group closest to the magnification side in the second optical system has a positive refractive power.

2. The zoom lens according to claim 1,
wherein Conditional Expression (1) is satisfied, $$0 < fw/f21 < 0.2 \quad (1),$$

where fw is a focal length of a whole system of the lens groups at a wide-angle end, and
f21 is a focal length of the lens group closest to the magnification side in the second optical system.

3. The zoom lens according to claim 1,
wherein Conditional Expression (2) is satisfied, $$3 < b/a < 15 \quad (2),$$

where b is a ray diameter within a meridian plane of a maximum image height at an F number which is five times a design F number at the wide-angle end, and
a is a ray diameter of on-axis rays at the F number which is five times the design F number at the wide-angle end.

4. The zoom lens according to claim 1,
wherein a third lens group from the magnification side in the second optical system is the movable lens group which has a positive refractive power.

5. The zoom lens according to claim 1,
wherein Conditional Expression (3) is satisfied, $$0 < |fw|/f23 < 0.15 \quad (3),$$

where fw is a focal length of a whole system of the lens groups at the wide-angle end, and
f23 is a focal length of the third lens group from the magnification side in the second optical system.

6. The zoom lens according to claim 1,
wherein Conditional Expression (4) is satisfied, $$0.05 < |fw|/f2e < 0.3 \quad (4),$$

where fw is a focal length of a whole system of the lens groups at the wide-angle end, and
f2e is a focal length of a lens group closest to the reduction side in the second optical system.

7. The zoom lens according to claim 1,
wherein Conditional Expression (5) is satisfied, $$0.7 < f1/|fw| < 3 \quad (5),$$

where f1 is a focal length of the first optical system at the wide-angle end, and
fw is a focal length of a whole system of the lens groups at the wide-angle end.

8. The zoom lens according to claim 1,
wherein the second optical system includes, in order from the magnification side, one of the movable lens groups, one of the stationary lens groups, another of the movable lens groups, and another of the stationary lens groups.

9. The zoom lens according to claim 1,
wherein the second optical system includes, in order from the magnification side, one of the stationary lens groups, one of the movable lens groups, another of the movable lens groups, and another of the stationary lens groups.

10. The zoom lens according to claim 1,
wherein the second optical system includes, in order from the magnification side, one of the movable lens groups, one of the stationary lens groups, another of the movable lens groups, a further one of the movable lens groups, and another the stationary lens groups.

11. The zoom lens according to claim 1,
wherein the first optical system remains stationary with respect to the reduction side imaging plane during zooming.

12. The zoom lens according to claim 2,
wherein Conditional Expression (1-1) is satisfied $$0.01 < |fw|/f21 < 0.15 \quad (1\text{-}1).$$

13. The zoom lens according to claim 3,
wherein Conditional Expression (2-1) is satisfied $$5 < b/a < 10 \quad (2\text{-}1).$$

14. The zoom lens according to claim 7,
wherein Conditional Expression (5-1) is satisfied $$0.8 < f1/|fw| < 2 \quad (5\text{-}1).$$

15. A projection display device comprising:
a light source;
a light valve into which light originating from the light source is incident; and
the zoom lens according to claim 1, the zoom lens projecting an optical image, which is formed by light modulated through the light valve, onto a screen.

16. An imaging apparatus comprising the zoom lens according to claim 1.

* * * * *